US011222290B2

(12) United States Patent
Singh et al.

(10) Patent No.: US 11,222,290 B2
(45) Date of Patent: Jan. 11, 2022

(54) INTELLIGENT CAPABILITY EXTRACTION AND ASSIGNMENT

(71) Applicant: ServiceNow, Inc., Santa Clara, CA (US)

(72) Inventors: Manjeet Singh, Rewari (IN); Bruce Walthers, San Jose, CA (US); Lingzhu Li, Mountain View, CA (US); Jeevan Anand Anne, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 290 days.

(21) Appl. No.: 16/356,246

(22) Filed: Mar. 18, 2019

(65) Prior Publication Data
US 2020/0302364 A1 Sep. 24, 2020

(51) Int. Cl.
G06Q 10/06 (2012.01)
G06N 20/10 (2019.01)
G06F 40/30 (2020.01)
G06F 40/253 (2020.01)

(52) U.S. Cl.
CPC ..... *G06Q 10/06316* (2013.01); *G06F 40/253* (2020.01); *G06F 40/30* (2020.01); *G06N 20/10* (2019.01)

(58) Field of Classification Search
CPC .. G06Q 10/06; G06Q 10/06316; G06N 20/10; G06F 40/253; G06F 40/30
USPC ...................................................... 705/7.14
See application file for complete search history.

(56) References Cited

U.S. PATENT DOCUMENTS

| 6,609,122 B1 | 8/2003 | Ensor |
| 6,816,898 B1 | 11/2004 | Scarpelli |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |

(Continued)

OTHER PUBLICATIONS

Operationalizing Customer Intelligence in the Contact Center Mitchell, Ike. Business Communications Review 37.12: 34-39. MultiMedia Healthcare Inc. (Dec. 2007).*

(Continued)

*Primary Examiner* — Timothy Padot
(74) *Attorney, Agent, or Firm* — Fletcher Yoder PC

(57) ABSTRACT

A system may include persistent storage containing representations of requests associated with a managed network. The persistent storage may include lists of capabilities associated with agents, and each request may include a textual description of a situation experienced by a user and a resolution of the situation by a particular agent. A computing device may obtain a set of requests from the persistent storage, apply an unsupervised machine learning clustering technique to textual descriptions included in the set of requests, and arrange the requests into groups such that each group contains requests including textual descriptions with at least a threshold degree of similarity to one another. The computing device may perform, for the requests in a particular group, a textual analysis on associated resolutions to identify capabilities used by agents to resolve the requests, and update the lists of capabilities to associate the capabilities with agents that used them.

20 Claims, 14 Drawing Sheets

(56) References Cited

U.S. PATENT DOCUMENTS

| | | | |
|---|---|---|---|
| 7,617,073 | B2 | 11/2009 | Trinon |
| 7,689,628 | B2 | 3/2010 | Garg |
| 7,783,744 | B2 | 8/2010 | Garg |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,674,992 | B2 | 3/2014 | Poston |
| 8,689,241 | B2 | 4/2014 | Naik |
| 8,724,795 | B1 * | 5/2014 | Aldrich ............... H04M 3/51 379/265.02 |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |
| 9,792,387 | B2 | 10/2017 | George |
| 9,819,729 | B2 | 11/2017 | Moon |
| 2004/0181759 | A1 * | 9/2004 | Murakami ............ G06F 16/374 715/259 |
| 2006/0224585 | A1 * | 10/2006 | Brockmeier ........... G06Q 30/08 |
| 2013/0211880 | A1 * | 8/2013 | Kannan .............. G06Q 30/0203 705/7.32 |
| 2013/0262089 | A1 * | 10/2013 | Whitman ............. G06F 16/335 704/9 |
| 2015/0358463 | A1 * | 12/2015 | O'Connor ........... H04M 3/5166 379/88.02 |
| 2017/0270505 | A1 * | 9/2017 | Tsou .................... G06Q 20/209 |
| 2017/0372231 | A1 * | 12/2017 | Ghatage ............ G06Q 10/0631 |

OTHER PUBLICATIONS

Using skills-based routing to enhance contact center revenue and performance. (Call Center/CRM Management Scope) L'Ecuyer, Mariane. Customer Interaction Solutions 21.11: 64(4). Technology Marketing Corporation. (May 2003).*

* cited by examiner

INTELLIGENT CAPABILITY EXTRACTION AND ASSIGNMENT

BACKGROUND

A request management system, also referred to as a ticketing system or a help desk, provides a framework for receiving and managing submissions from users and devices. Each submission may represent a situation experienced by a user or device and may correspond to a request for assistance, an incident report, or a different type of customer or employee related issue. As each user submission is received, the request management system uses one or more queues to organize the submissions until agents are available. In particular, for each submission received from a user (e.g., a customer, an employee), the request management system may generate a request that stores information associated with the submission.

Thus, each request may enable the request management system, and any agent that works on the underlying submission, to store and organize information regarding the submission. For example, when the submission is an incident or request submitted by an employee, the request management system may automatically populate the generated request to contain general information regarding the underlying submission, such as a time that the submission was received and an indication of the source of the submission (e.g., contact information of employee or customer), a division of operations related to the submission (e.g., the submission is related to customer service or information technology), a short description of the submission derived from the providing source, and a unique identification number for the request. This way, an agent may use the stored information to quickly understand and address the submission. In addition, the request may also enable any agent that works on the underlying submission to provide additional context, such as inputting a text description that serves as a resolution of the situation and conveys actions that the agent performed to resolve (or to attempt to resolve) the request.

SUMMARY

An enterprise may use a request management system to receive and manage the numerous submissions received from users, such as employees, customers, and other enterprises. With each submission representing some situation, it is desirable for the request management system to distribute requests efficiently to agents in a way that enables the agents to quickly resolve each submission. In particular, efficient distribution may depend on the request management system providing requests to agents that have the capabilities to effectively resolve the submissions. By distributing each submission to an agent with one or more particular capabilities suitable to resolve the submission, the request management system may decrease the amount of time each request takes to be resolved overall when addressed by an agent. In turn, the request management system may lower the time that each request remains in a queue awaiting review by an agent.

To enable efficient distribution of requests, the request management system may require information that conveys both the particular capabilities that each agent (or group of agents) possesses and associations that indicate which capabilities are most suitable for resolving which types of submissions. For example, the request management system may use a list of agent capabilities that indicates each agent's skills when assigning requests into queues associated with different agents.

A list of the capabilities of agents, however, might fail to accurately convey the actual capabilities possessed and used by agents. This inaccuracy may be due to current techniques used to determine the capabilities that agents use to resolve user submissions. One technique currently used to generate the lists of agent capabilities involves relying upon agents or a manager to determine and list the capabilities. This may cause issues, such as an inaccurately associating some capabilities with agents that do not have the capabilities and an inability for the request management system to understand and properly use some capabilities listed by agents or the manager when distributing requests.

Further, these current techniques fail to factor the frequency of use each capability by agents when resolving requests. For instance, the request management system might not quantify and determine that a particular capability (e.g., password reset) is used far more often than other capabilities. Thus, the request management system might not determine that it is important for agents to possess the particular capability. As a result, the enterprise might not make adjustments that could improve the efficiency of resolving user submissions (e.g., hiring more agents having a particular capability that is utilized frequently) or modifying operations to reduce incidents (e.g., fix a bug in an application based on detecting a high number of submissions related to the bug).

The embodiments presented herein involve intelligent capability extraction and assignment. A computing device, such as a computing device associated with a request management system, may obtain and analyze a number of previously addressed requests to identify and extract particular capabilities that agents used when working on the underlying user submissions associated with the requests. The computing device may use text-based pattern recognition and other machine learning techniques to analyze information contained within numerous requests to detect patterns. These patterns may include as textual similarities that arise when analyzing the resolution descriptions within requests representing similar user submissions (e.g., user requests, incident reports) for action verbs and other text that indicate actions performed by an agent. Through grouping and analyzing requests based on common features (e.g., similar language used in the text of resolution descriptions), the computing device may extract capabilities that agents appeared to use when resolving user submissions. The computing device may also associate a confidence with each capability extracted that represents how well the results of the text-analysis across numerous requests appears to convey that the capability is one actually used by an agent to resolve a submission. As such, the capabilities that the computing device identifies confidently (e.g., above a threshold confidence level) can be subsequently considered when distributing new requests to queues for addressment by an agent. Through automatic capability identification and extraction, the request management system may maintain accurate lists of capabilities that represent the abilities of particular agents and use the lists to efficiently distribute requests.

In addition, the computing device may also be configured to detect other patterns within large volumes of analyzed requests. For instance, the computing device may detect connections between certain types of user submissions and capabilities frequently used to resolve them. As a result, the enterprise may adapt operations to improve efficiency, such as hiring agents having particular capabilities that are used more frequently, training agents to learn a frequently used capability, or modifying operations that have been linked to numerous incidents or other user submissions received at the request management system.

Accordingly, a first example embodiment may involve a system. The system may include persistent storage configured to contain representations of a plurality of requests associated with a managed network. The persistent storage may include one or more lists of capabilities associated with a plurality of agents. Each of the requests respectively may include a textual description of (i) a situation experienced by a user, (ii) and a resolution of the situation by a particular agent of the plurality of agents. The system may further include one or more computing devices. The one or more computing devices may be configured to obtain, from the plurality of requests in the persistent storage, a set of requests and configured to apply an unsupervised machine learning clustering technique to the textual descriptions included in the set of requests. The one or more computing devices may also be configured to arrange the requests into a plurality of groups. Each group of the plurality of groups may contain requests including textual descriptions with at least a threshold degree of similarity to one another as determined by the unsupervised machine learning clustering technique. The one or more computing devices may be also configured to, for the requests in a particular group, perform a textual analysis on the associated resolutions to identify particular capabilities used by agents to resolve the requests. The one or more computing devices may also be configured to update the lists of capabilities in the persistent storage to associate the particular capabilities with agents that used the particular capabilities based on an outcome of the textual analysis.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
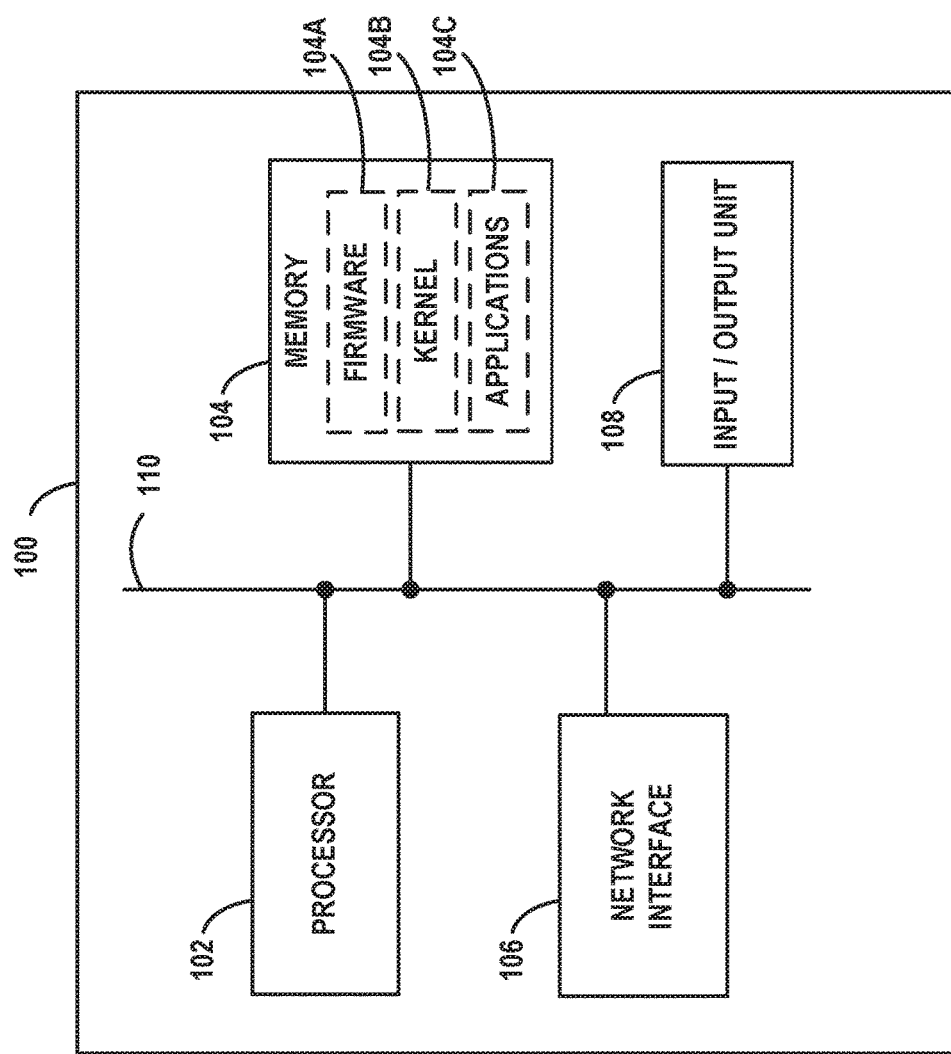
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
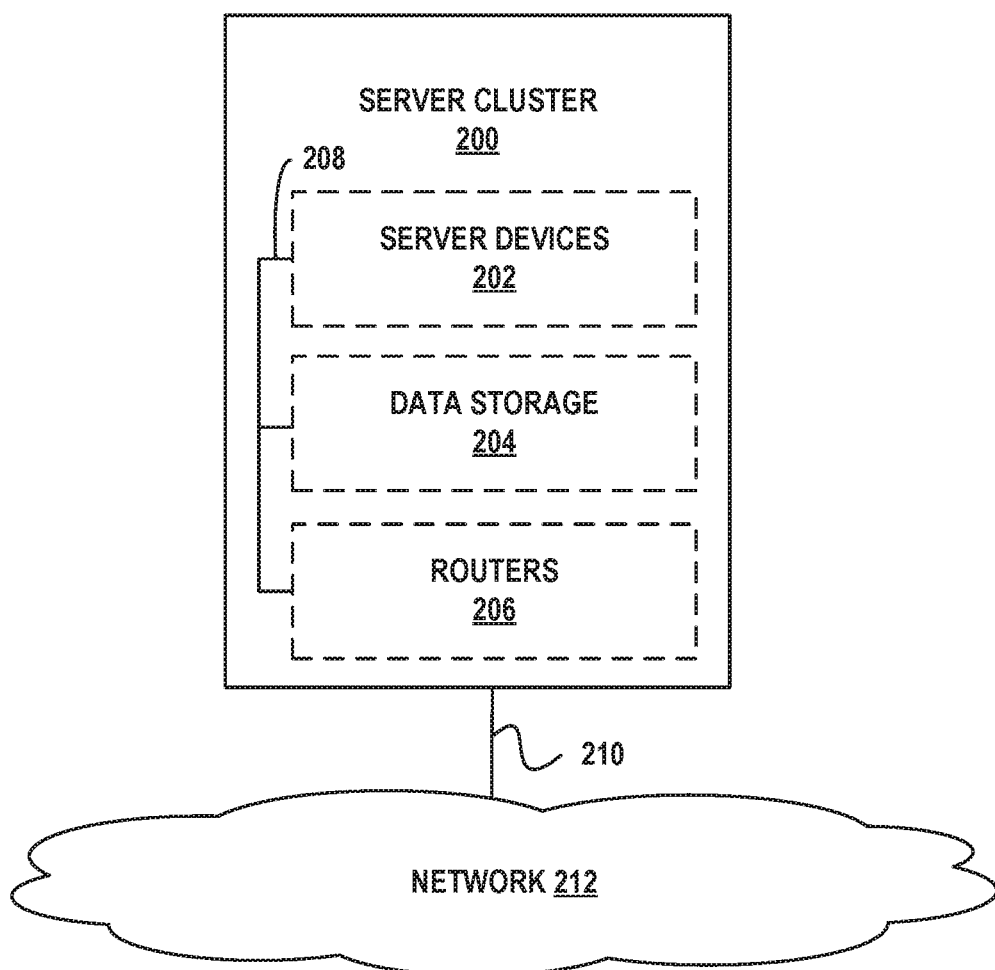
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
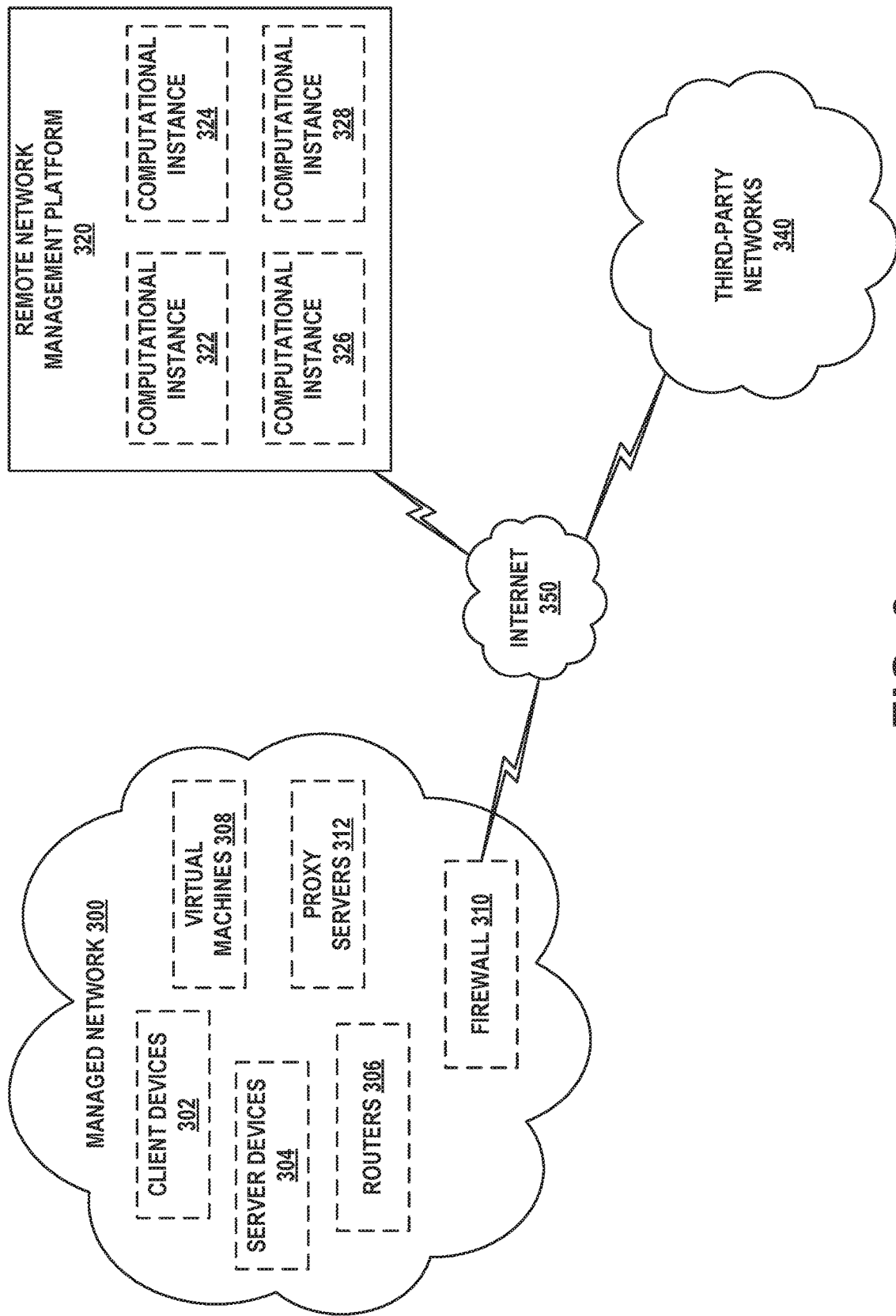
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
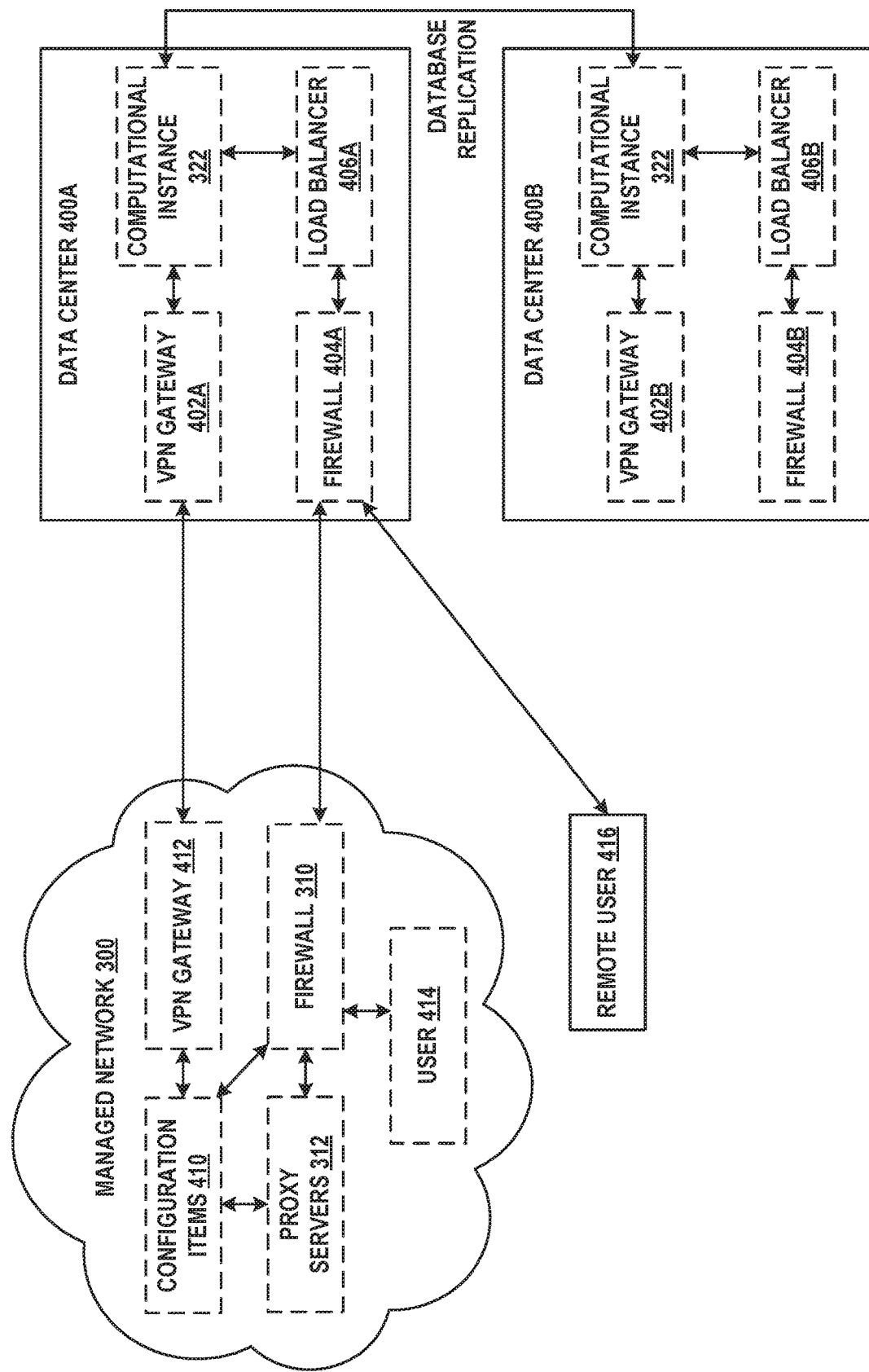
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
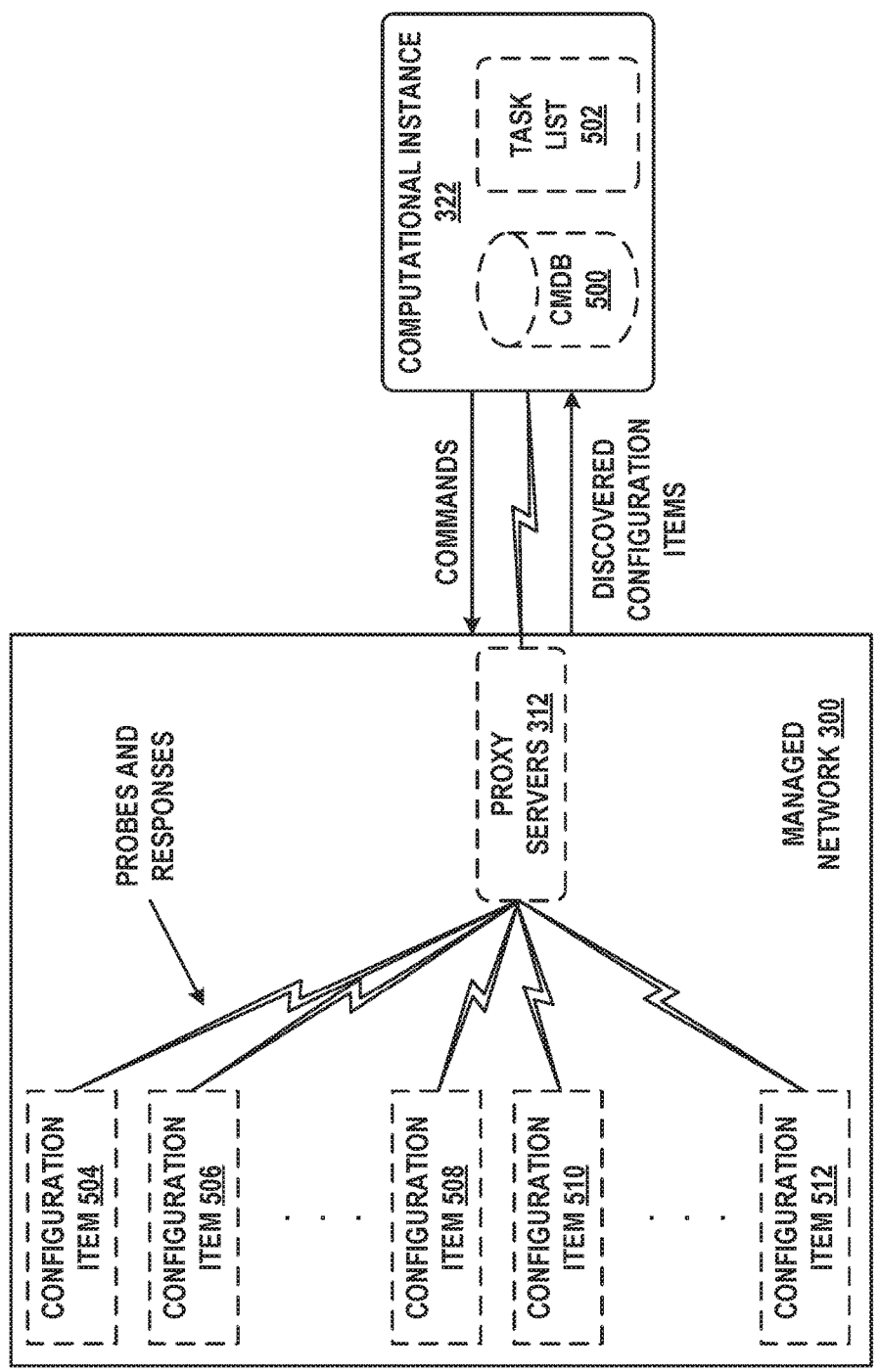
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
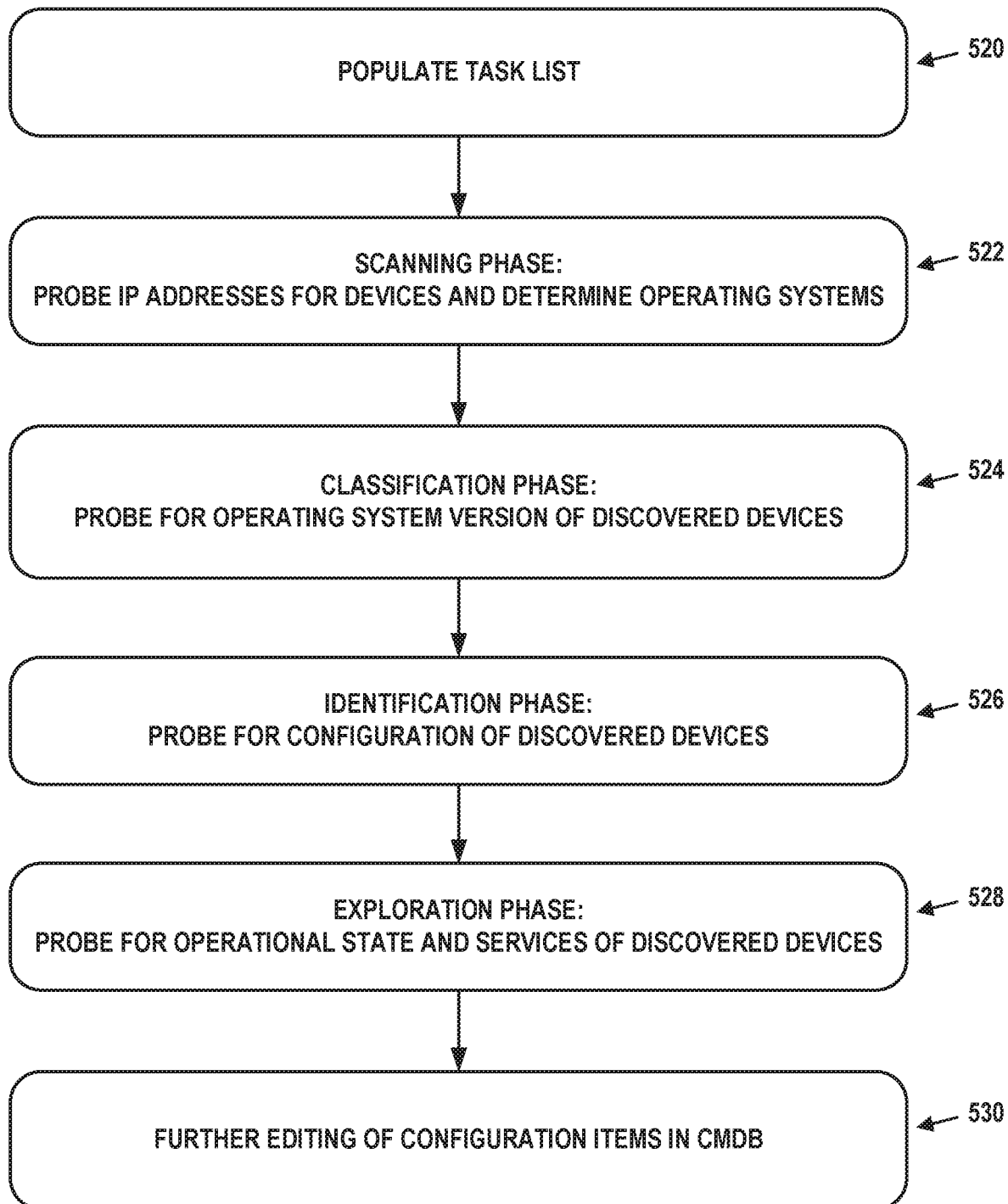
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE INTELLIGENT CAPABILITY EXTRACTION AND ASSIGNMENT

A request management system may provide an organizational framework for managing user submissions received during operations of an enterprise, such as requests for assistance, incident reports, and other customer or employee related issues or situations. Some submissions received at the request management system may correspond to a situation experienced by the user. For instance, a submission may reflect a situation where a user was unable to correctly enter a password or a situation where an application crashed for the user. Other types of situations experienced by users (e.g., employees, customers), software, or devices may be represented by submissions received at the request management system.

For each submission received, the request management system may generate a request to represent the submission. The request may organize and store information about the represented submission in a way that can help an agent address the submission, such as a short summary of the submission (e.g., a textual description of the situation experienced by a user) and an indication of the source of the submission (e.g., the department of the employee who submitted the submission). The request may also enable agents to record information related to working on the submission, such as a resolution description that includes text specifying the actions that the agent performed when addressing the situation experienced by the user and a status for the submission (e.g., resolved, not resolved). Each request may also include identification information that enables the enterprise to manage and monitor a large volume of user submissions.

The request management system may assign newly generated requests to a queue to wait for an available agent or directly to an available agent. A queue organizes requests according to a set of criteria (e.g., according to the temporal order that submissions were received at the request management system) until an agent is available. Once available, the agent may address a request (received directly or obtained from a queue) and attempt to resolve the underlying submission represented by the request. In some instances, the agent may resolve the submission and responsively complete a resolution description for the request. For example, the agent may write a few sentences describing actions that she performed to resolve the request as well as other possible notes.

In addition, the request management system may further store resolved requests in a database or another form of persistent storage. In some instances, the request management system may further store unresolved requests in the database. For example, the request management system may store unresolved requests after the requests remain unresolved for a threshold period after being initially addressed by an agent. As a result, an enterprise may access prior requests.

An enterprise may generate a large number of requests during a short time span. To efficiently manage an influx of user submissions, the request management system may be configured to distribute generated requests to agents based on the capabilities that each agent (or group of agents) possesses. A capability may be one or more learned abilities (e.g., knowledge, actions) that an agent utilizes to address and potentially resolve a situation represented by a request. An agent may use one or more capabilities to resolve a situation when addressing a request. As such, the request management system may use one or more queues to organize requests according to differences in underlying submissions such that agents with the necessary capabilities can address them efficiently.

To illustrate a simple example, the request management system may be configured to assign requests that represent a first type of situation (e.g., account issues) to a first queue and requests that represent a second type of situation (e.g., application issues) to a second queue. In the example, a first group of agents that have the experience and capabilities to address account issues may be assigned to the first queue and a second group of agents that have the experience and capabilities to address application issues may be assigned to the second queue. By using the multiple queues to distribute requests by type, the request management system may efficiently distribute and enable agents to effectively resolve requests. In such an example, agents may be able to avoid having to decline requests due to not having the necessary capabilities to address the requests. In addition, the agents may increase efficiency over time when assigned to focus on one type of submission. For instance, agents may specialize and focus on addressing submissions related to password problems, application problems, connecting to the network issues, customer-related issues, etc.

Effective distribution of requests might depend on the request management system having sufficient and accurate information indicating the various capabilities of the agents working within the system. Particularly, the request management system may use one or more lists that specify the capabilities of agents. Each list may indicate the different capabilities available for addressing requests and which agents possess which capabilities. In some examples, other information that associates capabilities with particular agents (e.g., a capability table) may be used when assigning requests to appropriate queues. Thus, it is desirable for the request management system to have information that accurately conveys the capabilities of each agent and also indicates which capabilities are used to address common submissions received at the request management system, such as reoccurring situations experienced by users.

Quantifying the capabilities of each agent to compile one or more lists of agent capabilities can be difficult and time intensive. In some cases, each agent may manually enter his or her capabilities to a list for the request management system to use to distribute subsequent requests. This technique, however, relies upon accurate representations of capabilities from the agents. This may not be the case since agents may exaggerate capabilities to appear more useful or may fail to identify or describe the capabilities that are actually applied to resolve submissions. In addition, the request management system may not clearly recognize the capabilities listed. For instance, each agent may use different terms to describe similar capabilities, which may cause the request management system to use the listed capabilities ineffectively.

In other cases, a manager or another administrator may be tasked with determining the capabilities of each agent to compile one or more lists of agent capabilities. This may lead to similar issues as well as increased costs since the manager may need to thoroughly review prior requests resolved by each agent to determine the capabilities that the agent has effectively used. Furthermore, the addition of every new agent may require further review by the manager or for the agent to attempt to quantify the capabilities that he or she believes is applicable to addressing user submissions.

In addition, conventional techniques used to fill out a list of capabilities used by agents may fail monitor the frequency that each capability is used. Particularly, the request management system may receive user submissions and distribute corresponding requests to queues without monitoring the outcomes of each request, including the actual capabilities applied by agents and the frequency that the capabilities are used to resolve requests.

Example implementations presented herein involve intelligent capability extraction and assignment. In particular, examples involving using text-based analysis on a large number of resolved requests to intelligently identify and extract capabilities that agents use to resolve submissions (e.g., incidents, requests, issues, situations) represented by the requests. By analyzing the text provided by agents within the resolution descriptions in numerous requests for particular action verbs and other detectable patterns, a computing device may detect phrases of text that represent potential capabilities that agents used to resolve submissions. The computing device may then validate one or more potential capabilities to update one or more lists of agent capabilities to reflect actual capabilities agents possess. As a result, a request management system may use the updated list of agent capabilities to efficiently distribute subsequent requests to agents that have the capabilities to address the represented submissions.

An enterprise may use persistent storage (e.g., a database) to contain representations of requests. The requests may be generated by a request management system and may be associated with a managed network. The persistent storage may further include one or more lists of capabilities associated with agents. The agents may employees of the managed network or contractors and may serve to address the situations experienced and submitted by users to the request management system. As such, each request may include a textual description of a situation experienced by a user and a resolution of the situation by a particular agent. These requests can be used to intelligently identify and extract capabilities (e.g., particular actions) used by agents to resolve the underlying situations represented by the requests.

Some examples involve using unsupervised machine learning to analyze the text within resolution descriptions of the requests. In particular, unsupervised machine learning and other pattern recognition techniques may be used to organize a large number of requests into groups such that each group contains requests that share common features (e.g., similar text or phrases). For example, a computing device may group requests based on similarities in the submission summaries and resolution descriptions within requests. Once groups are formed, further text-based analysis and other machine learning techniques may then be used to analyze requests within each group to detect certain words (e.g., action verbs), phrases, or other patterns within the resolution descriptions submitted by agents. In particular, the resolution descriptions may be analyzed to identify potential capabilities that may have been used by agents.

Any potential capability candidates can then be reviewed via a computing system or by an administrator. For example, the computing device may use a graphical user interface to present a list of potential capability candidate names and associated confidence levels to a subject matter expert (e.g., an administrator) who can review the list to identify actual capabilities. The review may involve approving, rejecting, or modifying the capability candidates. The approved and modified capability candidates may then be used to upgrade one or more lists that convey the capabilities that agents are able to perform as well as the agents that are capable of performing each capability. Thus, intelligent capability extraction via machine learning can be used to update and maintain one or more accurate lists of capabilities that a request management system may use to efficiently distribute new requests.

In addition, some examples may also involve monitoring how frequently each capability is used by agents. A computing device configured to analyze numerous requests to extract capabilities may also detect patterns in the use of particular capabilities by agents when resolving submissions. In particular, the computing device may identify some capabilities that are used more frequently to resolve submissions than other capabilities. Similarly, the computing device may also identify which agents use which capabilities most frequently. By monitoring the frequency of use of each capability along with use of the capabilities by agents, the computing device may determine additional information for an enterprise, such as whether more agents should learn a particular capability (e.g., how to reset an application for a user) and which capabilities are rarely used. The computing device may also detect which types of submissions are received more frequently at the request management system from employees, customers, or other enterprises. This way, the enterprise may adjust operations to fix issues in response to receiving a high number of submissions regarding a particular operation.

In some examples, an enterprise may employ capability-use frequency information to modify operations, such as adding more agents with a frequently-used capability, training agents to learn a particular capability, or addressing a particular issue that arises often within user submissions. For example, an enterprise may determine that a recently-rolled out web interface has resulted in the request management system receiving a large number of user submissions related to a particular aspect of the web interface. The enterprise may identify the issue associated with the web interface by analyzing the frequency of submissions received related to the web interface and the capabilities used to resolve the submissions. As a result of identifying a high number of submissions related to issues with the web interface, the enterprise may proactively fix the web interface thereby improving operations overall.

Intelligent extraction of capabilities and associating each capability with particular use cases via an automated process can also provide insightful analytics to an enterprise. Managers may use the analytics to determine how to grow, empower, and protect the workforce of enterprise. For example, a need for additional agents to have a particular capability may be identified based on the frequency of detection of the particular capability overall as well as the frequency of requests with user submissions that are resolved via the particular capability. As such, the analytics representing capabilities used may enable the enterprise to adapt the request management system to efficiently manage user submissions going forward. In addition, since the process is automated, the enterprise may use the process as a way to periodically calibrate the request management system to fit current needs. For instance, detection of variations in agent capability use, such as changes caused by seasonal needs (e.g., summer versus winter), may allow the enterprise to prepare the request management system and corresponding agent pool for changes in the future.

Figure 6:
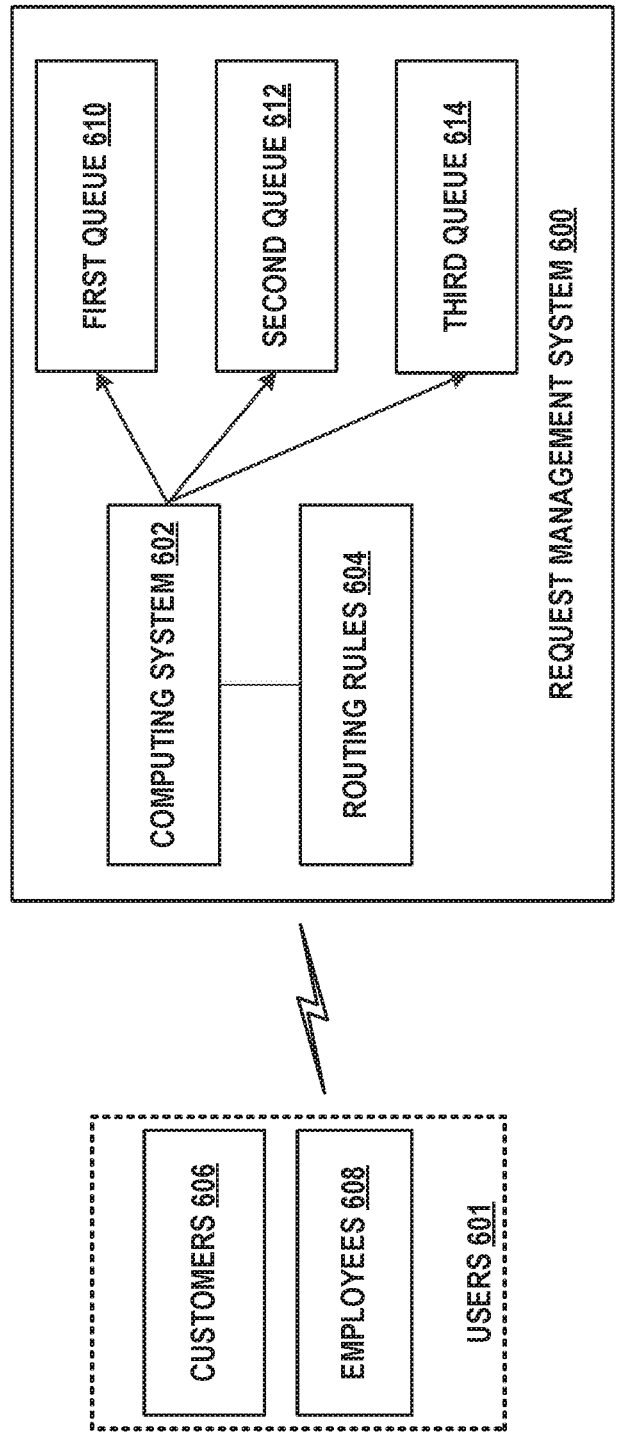
FIG. 6 depicts a request management system, in accordance with example embodiments.

To further illustrate, FIG. 6 depicts an example request management system arrangement configured for receiving user submissions and distributing corresponding requests to agents. Request management system 600 includes computing system 602, routing rules 604, first queue 610, second queue 612, and third queue 614. In other examples, request management system 600 may include more or fewer components.

Request management system 600 represents an example configuration that may receive and organize user submissions for an enterprise. Request management system 600 may receive requests, incidents, and other communications from users 601, such as customers 606 and employees 608. Users 601 can represent people or sources (e.g., devices, another enterprise) that may provide submissions to request management system 600. Customers 606 may correspond to people outside an enterprise that may pay for services or products from the enterprise. Employees 608 may represent people that work for the enterprise.

For each submission received at request management system 600, computing system 602 may generate a request to represent and stores information regarding the submission. As such, each request may include information about the underlying situation represented by the request. For instance, a request representing a user submission may specify information that can assist the agent address and resolve the request. The information may include the user's name, position within the enterprise (if any), geographic location, and an indication of the request or incident (e.g., a short textual summary of the situation). In some examples, a request may include minimal information about the represented request or issue, but rather primarily serve as a placeholder in a queue until addressed by an agent. The type of information included within a generated request may be configurable by an administrator overseeing request management system 600.

Computing system 602 may further assign requests into a queue (e.g., first queue 610, second queue 612, or third queue 614). In some examples, the operations performed by computing system 602 may be divided among multiple computing systems. For instance, a queue engine may be configured to receive submissions and assign corresponding requests into queues and an assignment engine may be configured to facilitate distribution of requests to capable and available agents.

As indicated above, requests may remain in queues until agents are available. A queue is a structure that can organize the requests generated by the request management system to represent different requests and issues submitted for agent review. One possible implementation of a queue is a database table or a file, both being persistent storage. Alternatively, non-persistent storage, such as main memory of a computing device, could be used.

Different types of queues can be used within examples. Some examples may involve using one or more structured queues. A structured queue arranges assigned requests in a fixed, predictable position. For instance, a first-in first-out (FIFO) queue is a type of structured queue that involves organizing requests according to the order that submissions are received. By using a FIFO queue, requests may be addressed in a predictable, sequential order.

Some examples may involve using one or more unstructured queues that do not arrange incoming requests in a predictable manner. For example, request management system 600 may use a ranking system when generating requests to associate a level of priority with each request. As a result, agents may selectively address some requests that have remained within the queue for a shorter duration than other requests. Other types of queues may be used by request management system 600.

When assigning requests into a queue, request management system 600 may use routing rules 604. Application of routing rules 604 may organize requests based on various criteria. For instance, each queue may represent a different aspect of the enterprise, such as groups, geographic locations, products, or other aspect of the enterprise. Routing rules 604 may depend on one or more lists of agent capabilities that convey the capabilities each agent (or group of agents) possesses.

Computing system 602 or another system may facilitate agent assignment to queues and distribution of requests among the agents. An agent may be a representative of the enterprise capable of addressing submissions represented by requests through the use of one or more capabilities. As such, an agent may be a human agent or a virtual agent.

A human agent may be an employee of the enterprise or a contractor who can review and address submissions represented by generated requests. For example, the IT group within the enterprise may serve as human agents that address requests and issues submitted by employees. As another example, an enterprise may include a customer service group consisting of agents that address submissions received from customers.

Virtual agents may also be used to address and resolve requests assigned to queues by request management system 600. A virtual agent may be a program based on artificial intelligence (AI) that can provide automated customer service, including the ability to address and resolve various types of submissions received at request management system 600. In particular, the AI may involve using machine learning and/or natural language processing, among other possible techniques. Each virtual agent may use AI and cognitive computing processes to communicate with the user submitting the request or issue. For instance, a virtual agent may engage in email, virtual chat, or voice communication. The virtual agent may be able to understand customer or employee intent (e.g., input from the user of the computing device) and can provide personalized answers to questions in a humanlike manner.

In some examples, a virtual agent may initially address a request and subsequently connect the customer or employee who submitted the represented issue or request with a human agent. For example, a virtual agent may initially obtain information regarding an issue represented by a request and then relay the request along with the obtained information to an available human agent. In other examples, a virtual agent may also address and resolve submissions without human agent intervention. In particular, the virtual agent might only submit a request to a human agent when the virtual agent lacks the capabilities to resolve the request, incident, or issue associated with the request. For example, the remote management system or the virtual agent itself may determine that the difficulty associated with resolving a particular submission exceeds a threshold difficulty level that the virtual agent is capable of handling. As a result, a human agent may be reassigned to the request.

An agent may address a submission represented by a request using various communication formats, the selection of which may depend on the type of communication used to submit the represented request or issue. For example, an agent may address a request representing a telephone call request by engaging in real-time voice communication with the employee or customer. In some cases, an agent may address and resolve a submission sometime after the request was created by request management system 600. For instance, the agent may resolve a request without participating in real-time communication with the user who submitted the request or issue when the request does not require direct communication. As an example, a request for approval (e.g., an email for a new software application, password reset) may enable an agent to review the request and approve without additional communication.

In some examples, a request management system used by an enterprise is provided and supported by a remote network management platform. For instance, remote network management network 320 may provide and support request management system 600 used by managed network 300. Request management system 600 may receive requests and issues that originate from computing devices in managed network 300 (e.g., client devices 302). Request management system 600 may further assign requests representing the received requests and issues into multiple queues for agents within managed network 300 to address.

Some example implementations may involve remote network management platform 320 managing managed network 300 by way of computational instance 322. In particular, computational instance 322 may be disposed within remote network management platform 320 and may include multiple queues for organizing requests for agent review. As such, a computing device within computational instance 322 may perform functions of a request management system, such as receiving and managing requests, incidents, and issues from users or devices associated with managed network 300. The computing device may also generate requests to represent the received requests and issues, and assign the requests into the multiple queues for agents within managed network 300 to address. In some examples, multiple computing devices could perform these functions. In further examples, agents associated with remote network management platform 320 may assist with addressing and resolving requests.

Figure 7:
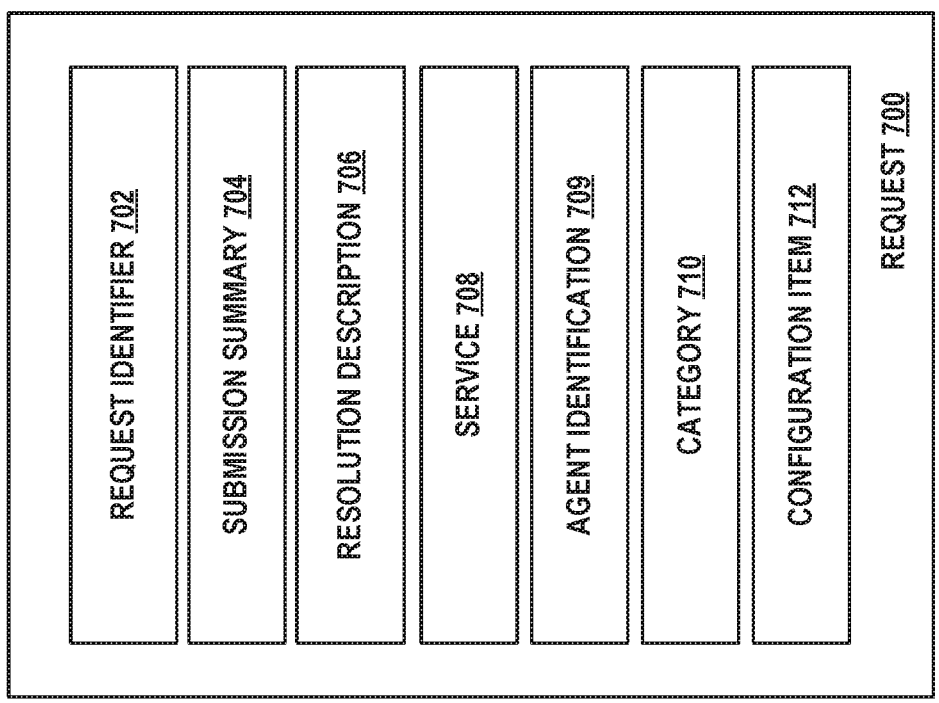
FIG. 7 depicts a request, in accordance with example embodiments.

FIG. 7 illustrates a configuration for a request, in accordance with example embodiments. Request 700 conveys an example configuration for a request that may be generated by request management system 600. In particular, request 700 may be used to represent a submission (e.g., request, incident, or another type of situation) received from user 601 or another source (e.g., a software application, another enterprise). In the example shown in FIG. 7, request 700 includes request identifier 702, submission summary 704, resolution description 706, service 708, agent identification 709, category 710, and configuration item 712. In other configurations, request 700 may include other elements and may have more or fewer elements overall.

A computing device may be configured to present request 700 to an agent working on the underlying submission represented by request 700. As such, the agent, an administrator, or other computing devices may have access to request 700 to modify values of the elements. For example, an agent may input textual descriptions within one or more elements of request 700.

Request identifier 702 represents a unique identifier for request 700 that enables agents and computing devices to differentiate request 700 from other requests. As such, request identifier 702 may be a numerical, alphanumerical, or another type of identifier unique to request 700. For example, a request management system may assign request identifiers to requests in an ascending order as the requests are generated. By including a request identifier with each request, the request management system or another computing device can query specific requests quickly. In some examples, request identify 702 may include convey a date and time that represents when request 700 was generated. This way, queries for requests can also be performed using time and date search parameters.

Submission summary 704 may provide information about the underlying submission represented by request 700. The request management system or another computing device may automatically compile submission summary 704 using information received along with the submission. For instance, a user may provide context when submitting a request or incident to the request management system. By extension, submission summary 704 may be used to organize the context in a manner that enables an agent to quickly review and understand the underlying submission represented by request 700 (e.g., in the form of a textual description of the incident or request). In some examples, an agent may provide submission summary 704 or part of submission summary 704 after reviewing request 700. For instance, the agent may add additional text to submission summary 704 after working on resolving the submission.

Resolution description 706 represents details related to work performed on the underlying submission. In particular, an agent may use resolution description 706 to describe actions performed to resolve (or attempt to resolve) the submission represented by request 700. For example, an agent may provide one or more sentences of text that describe the various actions that the agent performed or caused a system to perform to resolve a submission. The text provided by the agent or agents may include action verbs and gerunds in some cases.

Service 708 may indicate a source of the submission. For instance, the request management system may indicate the particular division or group within an enterprise that the submission originates from.

Agent identification 709 enables an agent to provide an identifier that associates the agent with request 700. For instance, the agent or the request management system may provide an agent number or a name for agent identification 709.

Category 710 may be another way to differentiate between requests. For example, the request management system may use category 710 to indicate if the submission corresponds to a user request or an incident report. Category 710 can be used to further divide requests based on the represented submissions.

Configuration item 712 may be used to express details related to the particular system, device, software, or component that provided the submission. The request management system may fill in configuration item 712 when generating request 700 or an agent may fill it in at a later time.

Figure 8A:
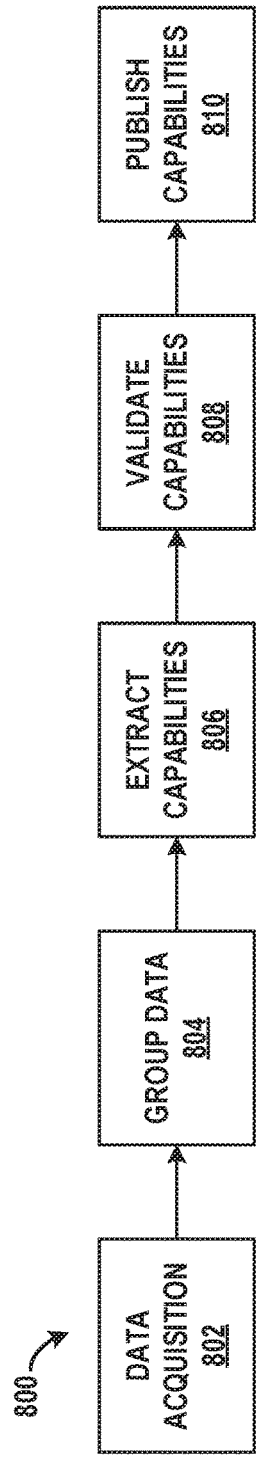
FIG. 8A depicts a routing flow diagram, in accordance with example embodiments.

FIG. 8A illustrates a routing flow diagram, in accordance with example embodiments. Routing flow 800 represents a process for intelligent capability extraction that may be performed by one or more computing devices. For example, one or more computing devices associated with request management system 600 may perform one or more steps of routing flow 800 to extract capabilities. The one or more computing devices may be part of request management system 600 or may be in communication with request management system 600.

The agent capabilities extracted via routing flow 800 may be used to develop and maintain one or more up to date lists of agent capabilities that request management system 600 can consider when distributing requests to agents. As such, one or more steps of routing flow 800 may be performed periodically to update a list of agent capabilities. For instance, a computing device may be configured to perform routing flow 800 to calibrate a list of agent capabilities on a set schedule (e.g., first day of the week, first day of the month). In other examples, the computing device may be configured to perform routing flow 800 in response to an event, such as the addition of a new agent or a shift change for agents. Thus, an enterprise may use the capabilities extracted during routing flow 800 to make operational decisions, such as modifying a current operation due to a high number of submissions received related to a particular operation or training agents to learn a particular capability that is used frequently.

Performance of routing flow 800 may involve analyzing the information provided by numerous requests. Particularly, as shown in FIG. 7, requests may include resolution descriptions that convey information (e.g., textual descriptions) indicating actions performed to resolve underlying submissions. In particular, an agent may provide text in the form of sentences or another format into the resolution description element of each request to describe actions that the agent performed to resolve (or attempt to resolve) the represented submission. Thus, the resolution description of a request may directly or indirectly convey the use of one capability, multiple capabilities, or no capabilities by an agent.

Automatic discovery and extraction of capabilities used by agents to resolve requests can involve different scenarios. In some cases, a capability or multiple capabilities may be explicitly stated within the resolution description or another portion of a request. For instance, an agent may input text into a resolution description that indicates that the agent "reset a password" for a user's account with the enterprise. When a capability is explicitly stated in the resolution description for multiple requests representing similar submissions, the computing device may extract the capability and associate a high confidence with the capability.

In other cases, a capability may not be explicitly stated within the resolution description of a request. The computing device may utilize text-based pattern recognition and other machine learning and data processing techniques to extract the capabilities from the text within the resolution descriptions of multiple requests. In such a situation, the computing device may "build-a-capability" based on common elements found within groupings of requests that share similar underlying submissions (e.g., related incident reports). Furthermore, in some scenarios, the computing device may fail to identify a capability when analyzing a group of similar capabilities. The resolution descriptions may not provide enough textual support for a particular capability to be extracted.

Step 802 of routing flow 800 involves performing an initial data acquisition. One or more computing devices may perform the data acquisition by obtaining requests from a database or another form of persistent storage associated with the enterprise. In some instances, the computing device may obtain information from particular elements of each request (e.g., submission summary 704 and resolution description 706 of request 700 shown in FIG. 7) from a large number of requests (e.g., hundreds or thousands of requests). The quantity of requests used for the initial data acquisition may depend on factors, such as the number of requests available, the size of the enterprise, the type of computing device performing routing flow 800, etc.

Figure 8B:
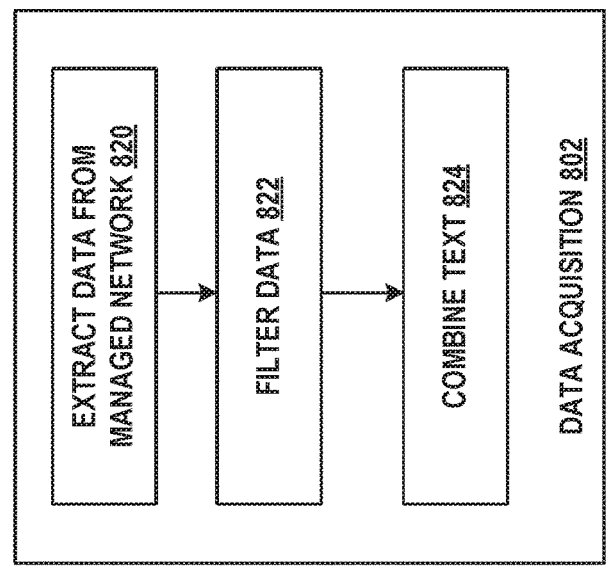
FIG. 8B depicts a data acquisition process, in accordance with example embodiments.

To further illustrate data acquisition, FIG. 8B depicts an example data acquisition process that involves steps 820, 822, and 824. The example data acquisition process shown in FIG. 8B represents one possible example, but others may be used when performing one or more steps of routing flow 800.

Step 820 involves extracting requests from one or more databases, such as a database associated with a managed network (e.g., managed network 300). In some instances, the requests may be extracted from another form of persistent storage.

A server device or another type of computing device may query a database or another form of persistent storage to obtain data corresponding to numerous requests (e.g., dozens, hundreds, thousands of requests). As shown in example request 700 depicted in FIG. 7, each request may include different elements of information, such as a unique request identifier, a submission summary, a resolution description, a service, an agent identification, a category, and a configuration item. The computing device may query the database for data corresponding to entire requests or for particular elements from requests.

Step 822 involves filtering the acquired data. In particular, the computing device may filter information obtained from requests to prepare for the information for subsequent capability extraction techniques.

In some examples, filtering the data may involve removing unwanted text or elements from the requests. For example, filtering may involve removing one or more Hypertext Markup Language (HTML) tags, Cascading Style Sheet (CSS) tags, non-American Standard Code for Information Interchange (non-ASCII) characters, carriage returns "\r" and line feeds "\n". In addition, filtering the data may further involve preparing the text for text-based analysis in other ways (e.g., removing unnecessary spacing).

Step 824 involves combining text for each request. In particular, a computing device may concatenate text within each request to generate a combined text to represent the request. The combined text may be more easily searchable by text-based analysis techniques.

In some examples, the computing device may concatenate the textual descriptions of the situation experienced by the user (e.g., the submission summary) and the resolution description of the situation provided by one or more agents that worked on the request. The computing device may also combine other elements of a request as part of the combined text. As such, the combined text may be analyzed to sort the requests into different groups Referring back to FIG. 8A, step 804 of routing flow 800 may involve grouping data after completion of the data acquisition (step 802). Grouping data may involve using text-based analysis and other machine learning techniques to form groups out of the requests that share common elements, such as common language within the combined text of each request.

In some examples, a computing device may apply an unsupervised machine learning clustering technique to the textual descriptions included in requests. The unsupervised machine learning may use k-means clustering or another technique to sort requests into groups based on similarities in the textual descriptions. For instance, the computing device may apply the unsupervised machine learning clustering technique to analyze the combined text within each request to identify common text patterns (e.g., same words or phrases) in order to divide the requests into groups. Each group formed can then be analyzed to extract one or more agent capabilities common to the group.

Figure 8C:
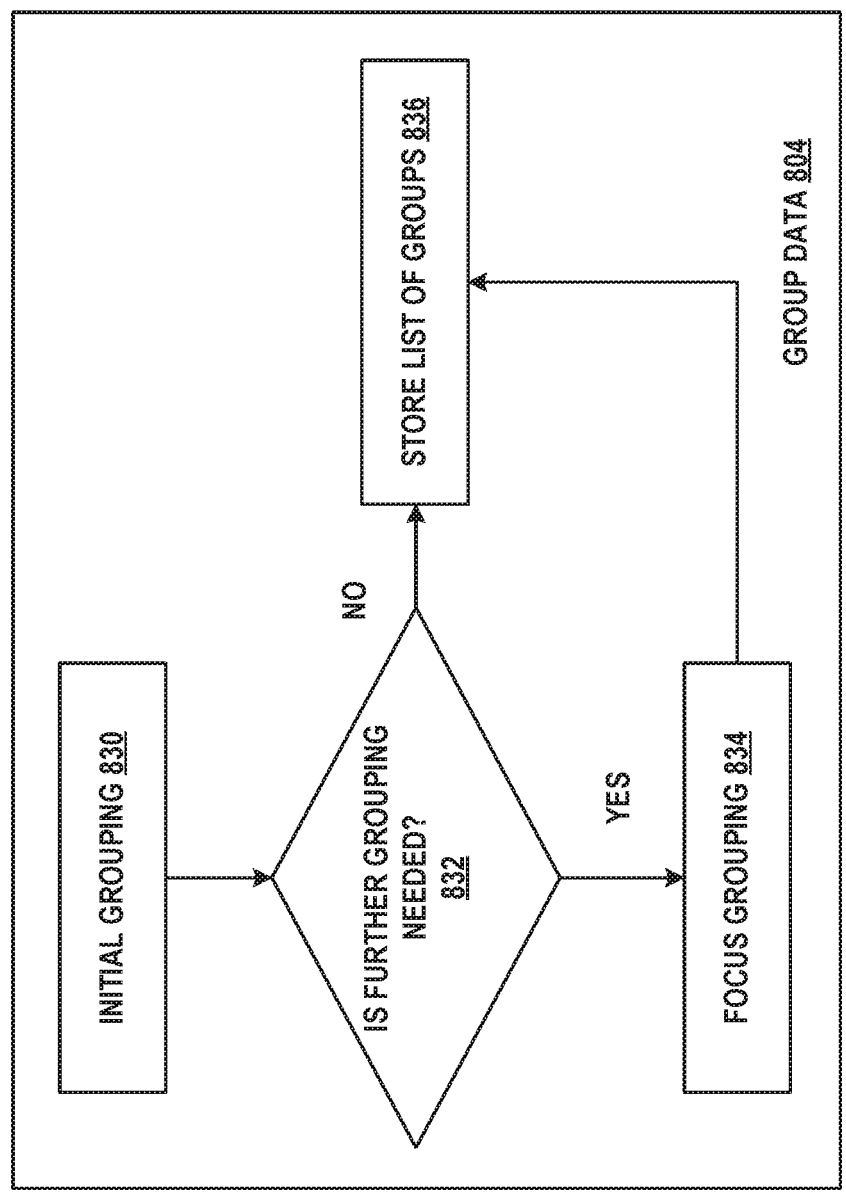
FIG. 8C depicts a grouping process, in accordance with example embodiments.

To further illustrate details regarding grouping data at step 804 of routing flow 800, FIG. 8C depicts an example grouping process that involves steps 830, 832, 834, and 836. The example grouping process represents one possible grouping process that may be used during implementation of routing flow 800. As such, other grouping processes may be used.

Step 830 involves performing an initial grouping of requests. In particular, a computing device may perform text-based analysis of the combined text of the requests to form groups of requests that share common text (e.g., common words or phrases). The computing device may perform text-based analysis using machine learning or other pattern recognizing techniques.

Machine learning is a method of data analysis that automates analytical model building. A computing device may use machine learning to learn from data (e.g., requests), identify patterns, and make decisions with minimal or no human intervention. Unsupervised machine learning may indicate that the machine learning is performed without human intervention or labels of data. As such, some example options for machine learning processes that can be used to initially group the requests include TFIDF/Word Embedding, DBSCAN, Topic Modeling, and HDBSCAN.

In some examples, the machine learning may be an unsupervised machine learning clustering technique that analysis the text within requests using k-means clustering. K-means clustering is a method of vector quantization that can be used for cluster analysis. In particular, k-means clustering may involve partitioning a set of observations into k clusters in which each observation belongs to the cluster with the nearest mean serving as a prototype of the cluster. As such, application of the unsupervised machine learning clustering technique may generate groups (clusters) of requests such that each group contains requests having at least a threshold degree of similarly to one another as determined by the technique.

In other embodiments, word vectors, paragraph vectors, or similar mechanisms may be used. These machine learning techniques may convert one or more words of text into a vector of numbers (e.g., of length 16, 32, 64, 128, 256, etc.) that represent the semantic meaning of the text. Thus, the similarities between two units of text can be quantified as the difference between their associated vectors. Such similarities can be determined by taking the Euclidian distance between the two vectors or by calculating the cosine similarity of the two vectors. Thus, the closest match in the database for a given unit of input text can be found based on these metrics by calculating the similarity between the input text's vector and vectors for each of the units of text in the database. Further, a confidence level can be inferred from the absolute difference or distance between the vectors, where the confidence is higher for smaller differences or distance, and where the confidence is lower for larger differences or distances. A threshold confidence level can be set that serves as a cutoff—in other words, matches with a similarity exceeding the threshold may be discarded or discounted.

Through the use of machine learning, the computing device may group together requests that share common elements within the combined text (e.g., similar action verbs or phrases) without human assistance. The quantity of groups formed may depend on one or more factors, such as the quantity of requests analyzed and the diversity of submissions received at the request management system.

Step 832 involves analyzing the initial groups formed using machine learning and determining whether any further groupings are needed (i.e., a focus grouping). A focus grouping may be used herein to represent one or more groups formed as a result of a further division of an initial group of requests. To determine whether any focus groupings are needed, the computing device may analyze each of the initial groups relative to a set of criteria.

In some examples, the criteria may specify maximum and minimum sizes for each initial group. For instance, the criteria may indicate a maximum threshold size for the number of requests that may be associated with a particular group (e.g., a 100 requests maximum size). As such, if an initial group is determined to have more than the predefined maximum threshold size (e.g., the initial group includes over 100 requests), the computing device may determine that focusing grouping is warranted for that group (i.e., further division of the group into multiple focus groups).

In such a situation, step 834 involves determining focus groups from the initial group that failed to meet criteria (e.g., the size of the initial group was too large). Dividing an initial group into multiple focus groups may involve using text-based analysis and pattern recognition or other machine learning techniques to determine the focus groups based on shared text features (e.g., common phrases, words, or sentences). For instance, the computing device may use DBSCAN, Topic Modeling, or HDBSCAN to further group the members of the group into focus groups. When additional focus groups are generated, the computing device may assign unique identifiers for each focus group.

In some examples, generation of focus groups from an initial group may involve using one or more additional iterations of the unsupervised machine learning clustering technique to distribute the requests into the focus groups. When performing additional iterations of the unsupervised machine learning clustering technique, the thresholds used to cluster requests into focus groups may differ from the thresholds used to form the initial groups. In particular, the thresholds used to form focus groups may require more similarities between the textual descriptions within the requests in a focus group (e.g., a higher threshold degree of similarity). Further, the size thresholds may differ as well when forming focus groups (e.g., a maximum size of 50 requests).

Grouping requests may involve using size and similarity requirements (e.g., different thresholds) to ensure that each group is within an ideal size range for processing and analysis. A group with too many requests may cause issues with analyzing and processing the information. Further, the large size of the group may indicate that the initial grouping was not based on the requests sharing enough text-based features in common. Similarly, a group with a low number of requests may prove difficult to analyze for enough similarities in text to extract capabilities.

When the computing device determines that a group satisfies the predefined criteria (e.g., the group comprises an appropriate amount of requests), the computing device may proceed to save the group to a list of groups (step 836). Each group or focus group added to the list of groups may be differentiated from the others via unique identifiers assigned by the computing device.

Referring back to FIG. 8A, step 806 of routing flow 800 may involve extracting capabilities from each group of requests. After organizing requests into groups based on similar textual features (e.g., phrases, sentences) and/or other aspects (e.g., similar underlying submissions), each group may be reviewed and analyzed to extract capabilities. In particular, the resolution descriptions (or combined text) of requests within a group may share similarities that enable a computing device to detect and extract capabilities therefrom.

Figure 8D:
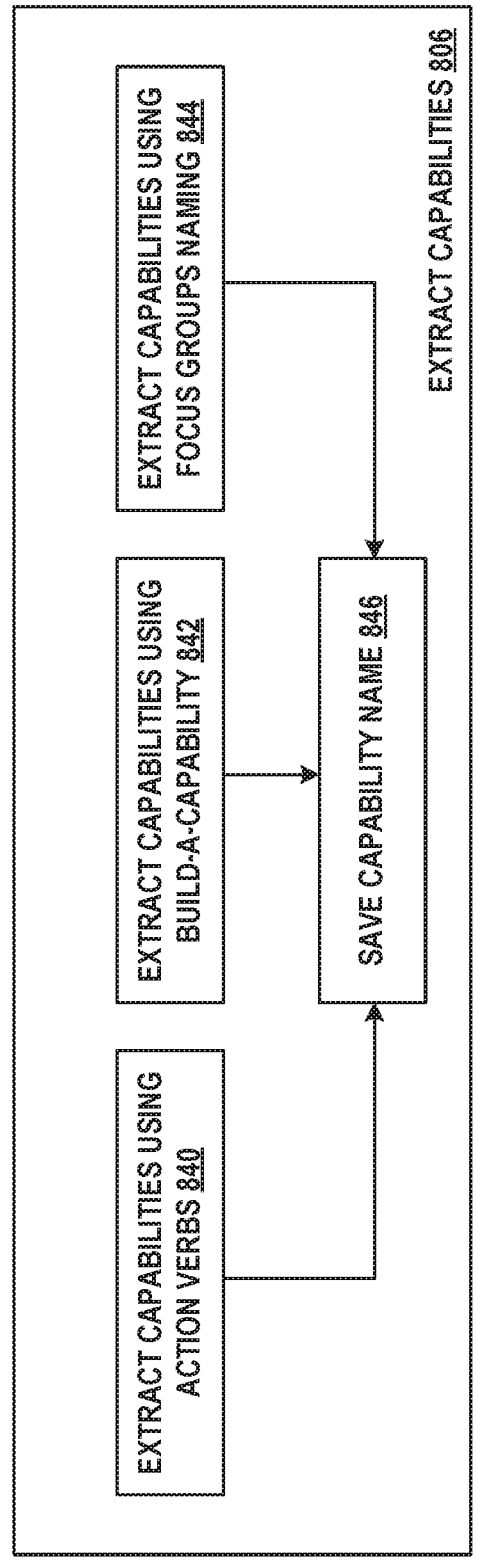
FIG. 8D depicts a capability extraction process, in accordance with example embodiments.

Within examples, extracting capabilities using the groups may involve different techniques. To further illustrate details for extracting capabilities from groups of requests, FIG. 8D depicts an example capability extraction process that involves steps 840, 842, 844, and 846. The different capability extraction techniques shown in steps 840, 842, and 844 may be performed in any order and may also be performed simultaneously. As such, a computing device may perform each technique in an iterative manner to enable subsequent comparison of results.

Step 840 involves extracting capabilities from a group of requests using action verbs. In particular, a computing device may perform a text rank process on sentences within resolution descriptions that contains action verbs for each group of requests. Here, the text rank process involves only analyzing sentences within the resolution descriptions that include one or more action verbs, such as "performed," "activated," "facilitated," or other action verbs. By focusing on sentences or phrases with action verbs, a text-based pattern recognition may be able to identify action verbs and extract potential capabilities that use action verbs. For example, the text-based pattern recognition may detect a "reset password" capability as a result of detecting action verbs associated with resetting a password, such as "performed password reset," "enabled reset password," and "completed password reset."

In some examples, the text rank process may use a predefined list of action verbs to identify and analyze sentences or phrases containing action verbs. The list may be comprehensive causing the text rank process to return potentially numerous sentences. In some examples, an administrator may modify the list of action verbs such that the text rank only analyzes text or sentences with particular action verbs.

In some examples, extracting capabilities based on action verbs may involve filtering the results of the text rank process to remove unwanted elements. Some action verbs may produce undesired results and the computing device may be configured to remove such results. The filtering process may involve removing unwanted text from the results or applying a predefined filter of words to remove. Using the filtered results, the computing device may then select a "best" capability based on features indicated within the results and output the particular capability along with an associated confidence level (here, the "best" capability is not necessarily the optimal capability, but a capability chosen according to the embodiments herein). In some examples, "best" capabilities are determined based on the evaluation of textual features, such as the number of words in the capability phrase (e.g., 1-4 words), frequency the capability phrase appears in the grouping (more frequent is better), that the capability phrase contains at least one noun, and preference is given to capability phrases with text constructions that have parts of speech that follow a verb-noun construction (i.e. changed password) or a noun-noun construction (i.e. password change).

A confidence level may indicate a level of accuracy that the text rank process estimated during analysis of the resolution descriptions for action verbs. In some examples, the confidence level may be binary and indicate whether the particular capability is acceptable or not at this point in the capability extraction process. In other examples, the confidence level may be represented using a range between zero and one with zero representing no confidence and one representing a high confidence level. In such a configuration, a 0.8 confidence level indicates that the system is more confident in an extracted capability than another capability associated with a 0.4 confidence level.

Step 842 involves extracting capabilities using a "build-a-capability" process. In particular, extracting capabilities using the "build-a-capability" process may involve using the text rank process on the entire text of resolution descriptions (or combined text) for each request within a group. Thus, the "build-a-capability" process may involve analyzing all sentences or phrases of the resolution descriptions (or combined text) of each request rather than focusing on sentences having action verbs (step 840).

In addition, after performing the text rank process, the computing device may filter the results to remove unwanted elements. The computing device may further use the filtered results to identify a "best" verb and a "best" noun phrase (here, the "best" verb and the "best" noun phrase are not necessarily the optimal verb and noun phrase, but chosen according to the embodiments herein). The computing device may combine the "best" verb and the "best" noun phrase into a combined verb-noun phrase to output the "best" capability prediction and a corresponding confidence level. The confidence level may depend on the results of the text-based analysis, such as a quantity of requests that include similar language to the identified "best" verb and the "best" noun phrase. In some examples, the confidence level may be binary and indicate whether the particular capability is acceptable or not at this point in the capability extraction process. In other examples, the confidence level may be represented using a range between zero and one with zero representing no confidence and one representing a high confidence level.

Step 844 involves extracting capabilities using focus groups naming. Here, the computing device may similarly use a text rank process on all text within resolution descriptions for each focus group of requests and filter the results to remove any unwanted elements. Using the output, the computing device may select the "best" option based on features with feature weights rebalanced for focus groups. For example, text based features may receive a feature weight to show how "important" that feature is in making a decision in selecting the "best" capability. In step 844, similar features may be used as features used in step 840; however, the feature weights can be very different. For example, the text feature "frequency the capability phrase appears in the grouping" may have a feature weight of (0.20) in step 840, whereas in step 844, the same feature may have a weight of (0.00), essentially causing the feature to not be used in the decision making in step 844. These feature weights may be derived after several iterations of experimentation and can be optimized using machine learning algorithms, such as stochastic gradient descent.

The computing device may then output the "best" capability prediction and confidence level. In some examples, the confidence level may be binary and indicate whether the particular capability is acceptable or not at this point in the capability extraction process.

Step 846 involves saving capabilities identified using the techniques above (steps 840, 842, 844) along with the confidence level determined with each technique. As a result, the computing device may compile a list of capabilities such that each capability has three confidence levels associated with it. The confidence levels for each capability saved to the list may vary due to differences in the techniques used to extract the capability.

In some cases, a group may not produce any capability for the list. A technique may render a "best" capability, but the associated confidence may indicate that the identified capability is not worthy for saving on the list. For example, when a technique utilizes a binary confidence scale, any capability identified with an associated zero (0) confidence score may not be saved on the list. The computing device may discard the capabilities that are not suitable for the list, thus reducing the amount of capabilities that may need to be reviewed overall. When the confidence levels represent levels between 0 and 1, the system may use a total confidence level quantity to determine whether or not to save a capability on the list. For example, if the capability levels score higher than 2 when added together (e.g., confidence levels 0.7, 0.6, 0.8 across the three techniques, respectively), the system may be configured to store the capability on the list.

Referring back to FIG. 8A, step 808 of routing flow 800 involves validating capabilities. In particular, the list of capabilities developed via capability extraction (step 806) may be reviewed to identify the capability candidates that may qualify as actual capabilities used by agents. In some examples, an administrator or another human may review the capabilities and associated confidences compiled in the list of capabilities. In other examples, a computing device may be configured to perform the review process. For instance, the computing device may analyze the extracted capabilities based on the confidence levels obtained during the different extraction techniques.

Figure 8F:
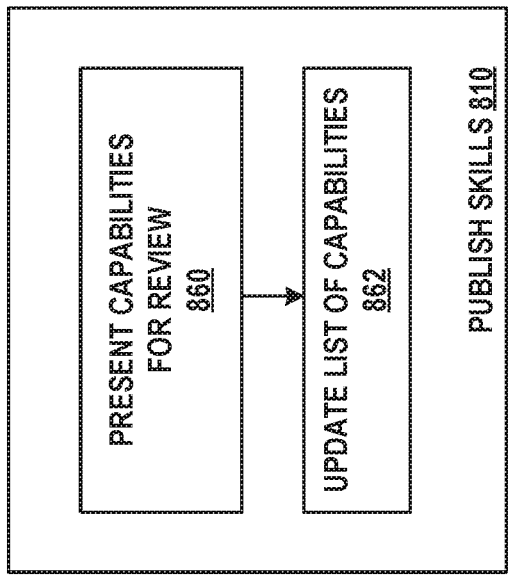
FIG. 8F depicts a capability publication process, in accordance with example embodiments.
Figure 8E:
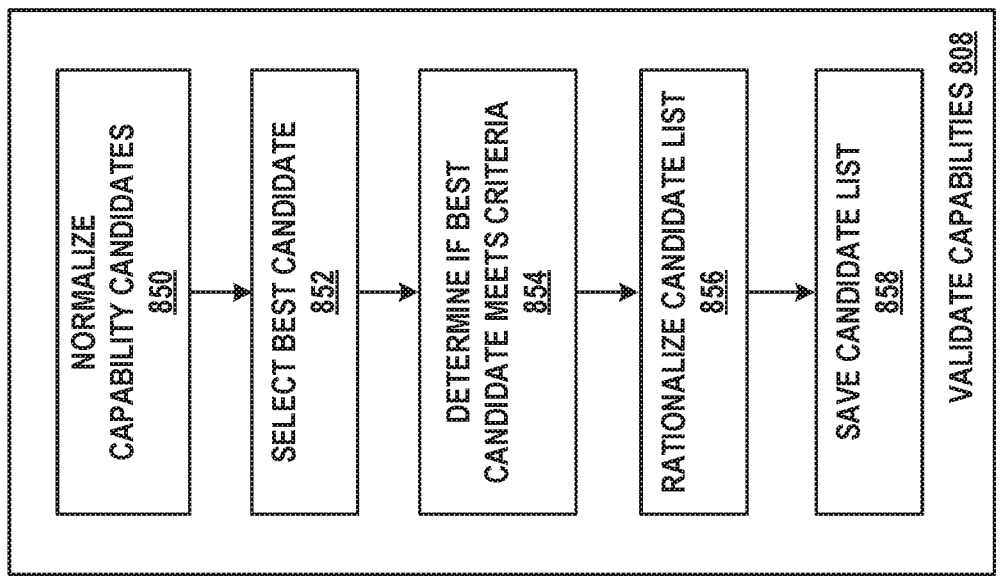
FIG. 8E depicts a capability validation process, in accordance with example embodiments.

To further illustrate details of capability validation (step 808), FIG. 8E depicts an example capability validation process that involves steps 850, 852, 854, 856, and 858. Other capability validations processes may be used within examples.

Step 850 involves normalizing capability candidates. A computing device may be configured normalize the capability data between the candidate capability names. The computing device may apply synergies between candidate capability names to normalize the capability data. In addition, the computing device may also normalize the confidence levels associated with the capabilities. In step 850, the confidence levels coming from Steps 840, 842, 844 may be normalized. Different techniques were used in those three steps and the confidence levels are in different scales. All confidence levels for steps 840, 842, and 844 may be rescaled to a range of 0 to 1 with 1 being the highest confidence score. This may enable comparison of the confidence levels from the 3 different approaches seen in steps 840, 842, 844 allowing the "best" capability candidate of the three to be identified in step 852.

Step 852 involves selecting the "best" candidate of the normalized capabilities. In particular, the computing device may use a set of rules to identify the "best" capability candidate (here, the "best" capability candidate is not necessarily the optimal capability candidate, but chosen according to the embodiments herein). In step 852, the computing device may determine which of the three capability candidates is the "best" candidate. For example, the computing device may use text features and weights for each of three capability candidates similar to what was seen in steps 840 and 844 and add the normalized confidence levels from step 850 as an addition feature with its own weight. The weights in step 852 may be determined independently from the weights in steps 840 and 844.

Step 854 involves determining if the selected "best" capability candidate meets overall criteria. For instance, the determination may involve determining whether the confidence levels exceed a set of predefined thresholds. In some examples, the threshold value is set to avoid showing subject matter experts any low "quality" capability candidates. The output from step 850 may be a single capability candidate for a grouping and a confidence level (a single number between 0 and 1, with closer to 1 meaning higher confidence). The computing device may compare the confidence level from the output from step 850 with the predefined threshold.

If the selected "best" capability candidate fails to meet the criteria (e.g., falls below one or more predefined thresholds), the computing device may determine that the capability candidate is not a capability. Conversely, when the selected "best" capability candidate meets the set of criteria (e.g., satisfies the one or more predefined thresholds), the capability candidate and its associated confidence level may be added to a capabilities candidate list.

Step 856 involves rationalizing the capabilities candidate list. The computing device may analyze the capabilities candidate list looking to remove duplicates or substantially similar capabilities on the capabilities candidate list. For example, the computing device may keep a capability and remove the capabilities with similar names (e.g., keep "password reset" and remove "reset passwords"). The computing device may be configured to select a particular name for each capability candidate based on the variations available. The computing device may select a particular name based on predefined criteria or similarities in the names across the three options.

Figure 9:
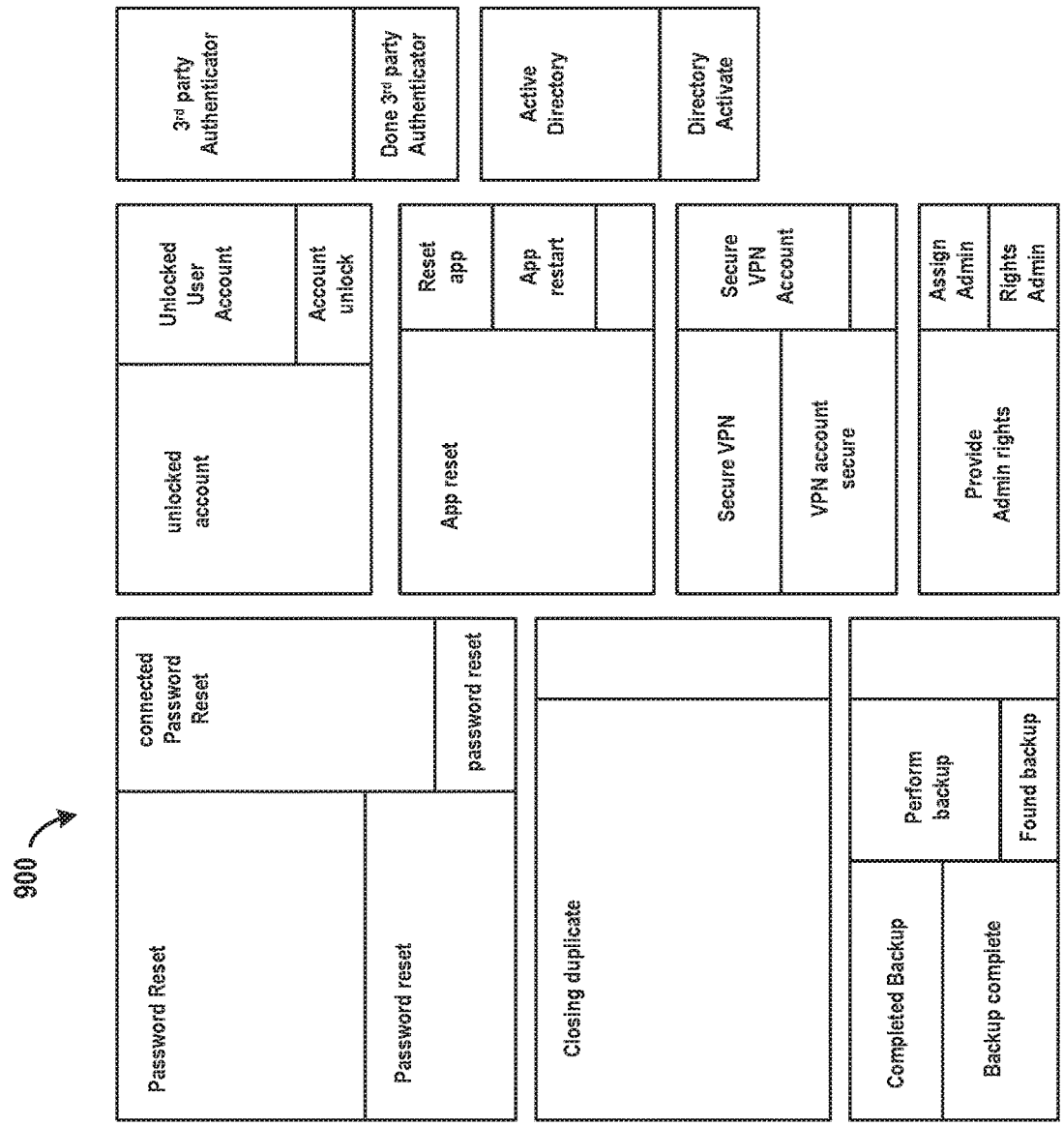
FIG. 9 illustrates a rationalized capability candidate list, in accordance with example embodiments.

FIG. 9 illustrates a rationalized capability candidate list, in accordance with example embodiments. The capability candidate list may be rationalized to create rational capability candidate list 900. In particular, rational capability candidate list 900 is shown in a visual format capable of being displayed via a graphical user interface (GUI) to convey similarities in capabilities names. For example, a computing device may display rational capability candidate list 900 on a GUI for an administrator to review. In some examples, a computing device may rationalize a capability candidate list without generating a visual format to display.

For each identified capability, the computing device may be configured to remove duplicates such that the capability is associated with a single name or phrase. For example, a capability related to "Password Reset" is shown with different possible name configurations. The size of the box associated with each capability name may indicate the confidence level associated with that name. The confidence level associated with that name may depend on factors, such as the number of times that particular capability name was detected during capability extraction and the association between the capability and action verbs. Thus, since "Password Reset" has a larger box than the other versions ("Password reset", "password reset", and "connected Password Reset"), the computing device may associate a high confidence using "Password Reset" as the name for the capability used by agents.

Further, the size of the overall box for each capability group may indicate the prevalence of the capability during capability extraction. In particular, the "Password Reset" capability and "Closing Duplicate" capability have larger boxes than other capabilities, such as the "unlocked account" capability and the "App reset" capability. This may indicate that agents use the "Password Reset" capability and "Closing Duplicate" capability more often than the other capabilities.

Referring back to FIG. 8E, step 858 involves saving the candidate list. Particular, once the computing device refined the capabilities candidate list, the computing device may proceed to save the list of capability candidates. In some examples, the confidence for each saved capability may be included with the list of capability candidates.

Referring back to FIG. 8A, step 810 of routing flow 800 involves publishing capabilities. To further illustrate details of publishing capabilities (step 810), FIG. 8F depicts an example capability publishing process that involves steps 860 and 862. Other capability publishing processes may be used.

Step 860 involves presenting the list of capability candidates to a subject matter expert (e.g., an administrator). In particular, the computing device may provide the list of capability candidates for review by a subject matter expert who may perform one or more tasks using the list, such as approve one or more capabilities, rename one or more capabilities, and reject one or more capabilities, etc. In some embodiments, the computing device may be configured to perform one or more tasks that a subject matter expert may perform.

Step 862 involves updating the list of capabilities to incorporate the approved capabilities. The computing device may add capabilities to one or more agent capabilities lists associated with a managed network. In addition, the computing device may further associate a submission with the added capability. For example, the computing device may associate a particular incident with a capability. In addition, the computing device may revise a list of agent capability lists to represent which agents have the ability to use the newly added capabilities.

VI. EXAMPLE OPERATIONS

Figure 10:
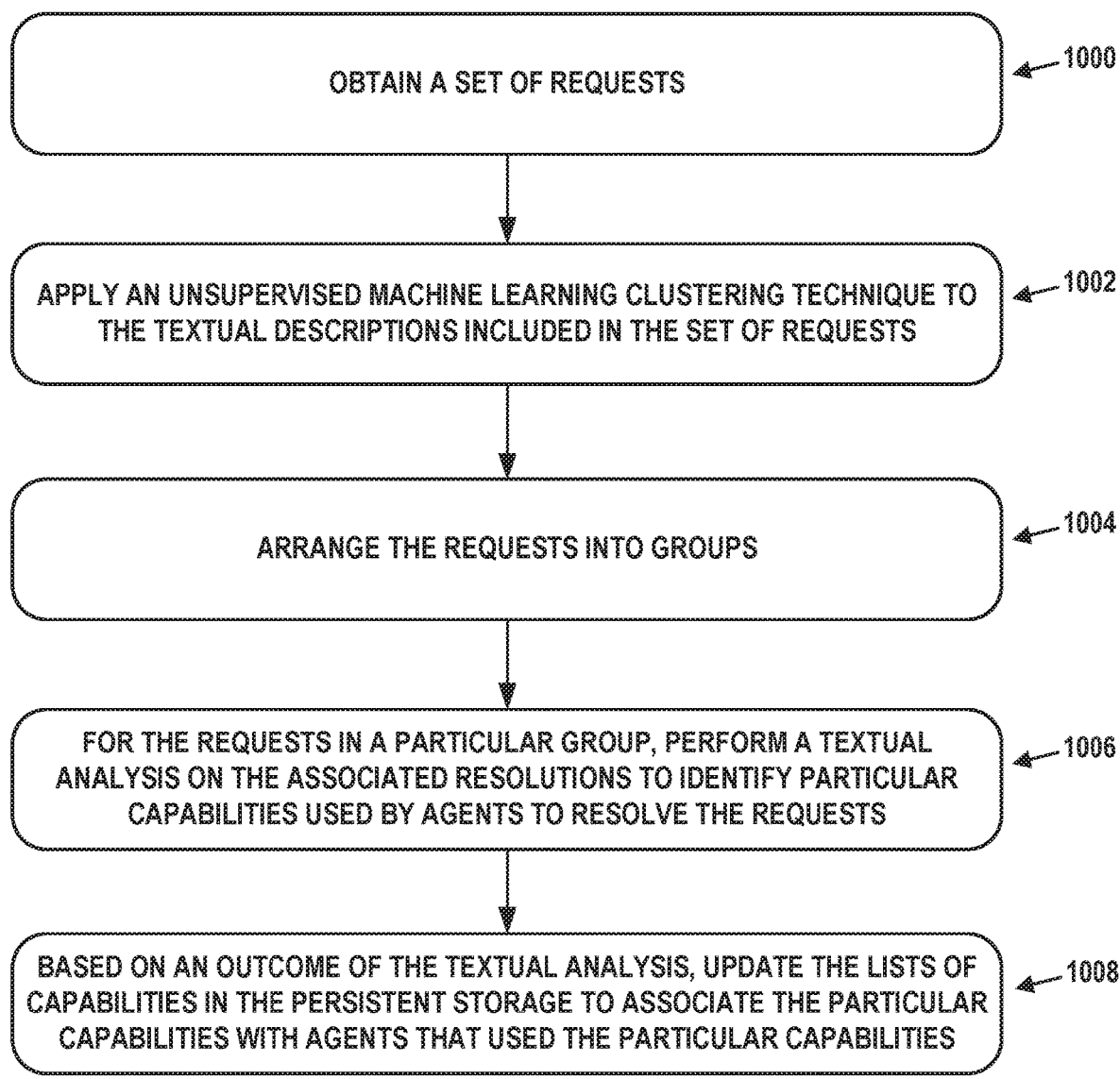
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves obtaining a set of requests. For instance, the set of requests may be obtained from the requests in a persistent storage. The persistent storage may be configured to contain representations of requests associated with a managed network. The persistent storage may also include lists of capabilities associated with agents. Each of the requests may respectively include a textual description of a situation experienced by a user (e.g., a submission summary) and a resolution of the situation by a particular agent (e.g., a resolution description).

Some examples may further involve filtering the textual description of the situation and the resolution in each request in the set of requests to remove one or more predefined elements responsive to obtaining the set of requests. Examples of predefined elements include Hypertext Markup Language (HTML) tags, Cascading Style Sheet (CSS) tags, non-American Standard Code for Information Interchange (non-ASCII) characters, carriage returns "\r", and line feeds "\n".

In addition, some examples may further involve combining, for each request in the set of requests, the textual description of the situation and the resolution to generate a combined text to represent each request. For instance, combining the textual description to generate a combined text to represent each request may be performed responsive to filtering the textual description of the situation and the resolution of each request of the set of requests to remove the one or more predefined elements.

Block 1002 involves applying an unsupervised machine learning clustering technique to the textual descriptions included in the set of requests. For example, the unsupervised machine learning clustering technique may use k-means clustering.

Some examples may involve applying the unsupervised machine learning clustering technique to respective combined texts when the textual description of the situation and the resolution of each request were combined to generate combined texts.

Block 1004 involves arranging the requests into groups. Each group may contain requests including textual descriptions with at least a threshold degree of similarity to one another as determined by the unsupervised machine learning clustering technique. In some examples, the threshold degree of similarity may depend on a quantity of requests in the set of requests.

Some examples may involve comparing a quantity of requests in each group with a predefined threshold quantity. For instance, the comparison may be performed in response to arranging the requests into the groups. As such, the predefined threshold quantity may specify a maximum number of requests per group (e.g., 100 requests maximum per group). The predefined threshold quantity may be used to limit the overall size of groups for more efficient processing and to yield more accurate results when extracting capabilities used by agents from each group.

When the comparison indicates that a quantity of requests for a particular group exceeds the predefined threshold quantity, a second iteration of the unsupervised machine learning clustering technique may be applied to the textual descriptions included in requests in the particular group. As such, the requests in the particular group may be arranged into a set of focus groups based on the results of the second iteration of the unsupervised machine learning clustering technique. This comparison process may be repeated until all groups of requests satisfy the predefined threshold quantity.

Block 1006 involves, for the requests in a particular group, performing a textual analysis on the associated resolutions to identify particular capabilities used by agents to resolve the requests. Performing the textual analysis may involve detecting one or more action verbs in the associated resolutions and determining a quantity of detections for each action verb of the one or more action verbs. As such, the computing device may identify one or more capabilities used by agents to resolve requests based on respective quantities associated with the one or more action verbs.

Performing the textual analysis may also involve detecting verbs and noun phrases in the associated resolutions and combining a particular verb with a particular noun phrase to generate a verb-noun phrase. The computing device may identify one or more capabilities used by agents to resolve the requests based on the generated verb-noun phrase.

In some examples, performing the textual analysis on the associated resolutions to identify particular capabilities used by agents to resolve the requests may produce a set of capability candidates. As such, a computing device may further compare the set of capability candidates identified by performing the textual analysis on the associated resolutions. Based on the comparison of the set of capability candidates, the computing device may identify particular capabilities used by agents to resolve the requests.

Some examples may involve performing the textual analysis on associated resolutions for each focus group of the set of focus groups. In particular, when a computing device uses the unsupervised machine learning clustering technique to further divide a group of requests into a set of focus groups, the computing device may perform the textual analysis on associated resolutions for each focus group.

Block 1008 involves updating the list of capabilities in the persistent storage to associate the particular capabilities with agents that used the particular capabilities. A request management system may use the updated lists when subsequently distributing requests to agents.

Some examples may involve responsive to performing the textual analysis on the associated resolutions to identify particular capabilities used by agents to resolve the requests, providing, via a graphical user interface, the particular capabilities for review by an administrator. As such, updating the lists of capabilities in the persistent storage to associate the particular capabilities with agents that used the particular capabilities may involve receiving, via the graphical user interface, an approval for a set of capabilities, and updating the list of capabilities in the persistent storage to associate the set of capabilities with agents that used the set of capabilities.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage configured to contain representations of a plurality of requests associated with a managed network, wherein the persistent storage includes lists of capabilities associated with a plurality of agents, and wherein each request of the plurality of requests respectively includes a textual description of (i) a situation experienced by a user, (ii) and a resolution of the situation by a particular agent of the plurality of agents; and
    one or more computing devices configured to communicate with one or more client devices of a managed network by way of one or more proxy servers, wherein the one or more computing devices are configured to host a client instance accessible to the one or more client devices by way of the managed network, the one or more proxy servers, or both, and wherein the one or more computing devices are configured to:
        obtain, from the plurality of requests in the persistent storage, a set of requests;
        apply an unsupervised machine learning clustering technique to textual descriptions included in the set of requests;
        arrange the requests from the set of requests into a plurality of groups, wherein the requests in each group of the plurality of groups include textual descriptions of at least a threshold degree of similarity to one another as determined by the unsupervised machine learning clustering technique;
        responsive to arranging the requests from the set of requests into the plurality of groups, compare a quantity of requests in each group of the plurality of groups with a predefined threshold quantity, wherein the predefined threshold quantity specifies a maximum number of requests per group;
        based on determining that the quantity of requests for a specific group exceeds the predefined threshold quantity, apply a second iteration of the unsupervised machine learning clustering technique to textual descriptions included in requests in the specific group; and
        arrange the requests in the specific group into a set of focus groups based on results of the second iteration of the unsupervised machine learning clustering technique;
        for the requests in a particular group of the plurality of groups, perform a textual analysis on associated resolutions to identify particular capabilities used by agents to resolve the requests in the particular group; and
        based on an outcome of the textual analysis, update the lists of capabilities in the persistent storage to associate the particular capabilities with agents that used the particular capabilities.

2. The system of claim 1, wherein the one or more computing devices are configured to:
    responsive to obtaining the set of requests, filter the textual description of the situation and the resolution in at least some of the requests of the set of requests to remove one or more predefined elements.

3. The system of claim 2, wherein the one or more predefined elements comprises one or more Hypertext Markup Language (HTML) tags, Cascading Style Sheet (CSS) tags, non-American Standard Code for Information Interchange (non-ASCII) characters, carriage returns, or line feeds, or any combination thereof.

4. The system of claim 2, wherein the one or more computing devices are configured to:
    responsive to filtering the textual description of the situation and the resolution in at least some of the requests of the set of requests, combining, for each request in the set of requests, the textual description of the situation and the resolution to generate a combined text to represent each request.

5. The system of claim 4, wherein applying the unsupervised machine learning clustering technique to the textual descriptions included in the set of requests comprises:
    applying the unsupervised machine learning clustering technique to the combined text.

6. The system of claim 5, wherein the unsupervised machine learning clustering technique involves using k-means clustering.

7. The system of claim 1, wherein the at least the threshold degree of similarity depends on a quantity of requests in the set of requests, in each group of the plurality of groups, or a both.

8. The system of claim 1, wherein performing the textual analysis on the associated resolutions to identify the particular capabilities used by the agents to resolve the requests comprises:
    detecting one or more action verbs in the associated resolutions;
    determining a quantity of detections for each action verb of the one or more action verbs; and
    based on respective quantities associated with the one or more action verbs, identifying the particular capabilities used by the agents to resolve the requests.

9. The system of claim 1, wherein performing the textual analysis on the associated resolutions to identify the particular capabilities used by the agents to resolve the requests comprises:
    detecting verbs and noun phrases in the associated resolutions;
    combining a particular verb with a particular noun phrase to generate a verb-noun phrase; and
    based on the verb-noun phrase, identifying the particular capabilities used by the agents to resolve the requests.

10. The system of claim 1, wherein performing the textual analysis on the associated resolutions to identify the particular capabilities used by the agents to resolve the requests produces a set of capability candidates, and wherein the one or more computing devices are configured compare the set of capability candidates, wherein the particular capabilities used by the agents to resolve the requests are identified based on the comparison between the set of capability candidates.

11. The system of claim 1, wherein the one or more computing devices are configured to:
responsive to performing the textual analysis on the associated resolutions to identify the particular capabilities used by the agents to resolve the requests, providing, via a graphical user interface, the particular capabilities for review by an administrator;
wherein updating the lists of capabilities in the persistent storage to associate the particular capabilities with the agents that used the particular capabilities comprises:
receiving, via the graphical user interface, an indication of an approval for a set of capabilities; and
based on the indication of the approval, updating the list of capabilities in the persistent storage to associate the set of capabilities with the agents that used the set of capabilities.

12. The system of claim 1, wherein performing the textual analysis on the associated resolutions to identify the particular capabilities used by the agents to resolve the requests comprises:
performing the textual analysis on associated resolutions for each focus group of the set of focus groups.

13. A method comprising:
obtaining, at a computing device and from a plurality of requests in a persistent storage, a set of requests, wherein persistent storage is configured to contain representations of the plurality of requests associated with a managed network, wherein the computing device is configured to communicate with one or more client devices of the managed network by way of one or more proxy servers, wherein the computing device is configured to host a client instance accessible to the one or more client devices by way of the managed network, the one or more proxy servers, or both, wherein the persistent storage includes lists of capabilities associated with a plurality of agents, and wherein each request of the plurality of requests respectively includes a textual description of (i) a situation experienced by a user, and (ii) a resolution of the situation by a particular agent of the plurality of agents;
applying, by the computing device, an unsupervised machine learning clustering technique to textual descriptions included in the set of requests;
arranging, by the computing device, the requests from the set of requests into a plurality of groups, wherein the requests in each group of the plurality of groups include textual descriptions of at least a threshold degree of similarity to one another as determined by the unsupervised machine learning clustering technique;
responsive to arranging the requests from the set of requests into the plurality of groups, comparing a quantity of requests in each group of the plurality of groups with a predefined threshold quantity, wherein the predefined threshold quantity specifies a maximum number of requests per group;
based on determining that the quantity of requests for a specific group exceeds the predefined threshold quantity, applying a second iteration of the unsupervised machine learning clustering technique to textual descriptions included in requests in the specific group; and
arranging the requests in the specific group into a set of focus groups based on results of the second iteration of the unsupervised machine learning clustering technique;
for the requests in a particular group of the plurality of groups, performing, by the computing device, a textual analysis on associated resolutions to identify particular capabilities used by agents to resolve the requests in the particular group; and
based on an outcome of the textual analysis, updating, by the computing device, the lists of capabilities in the persistent storage to associate the particular capabilities with agents that used the particular capabilities.

14. The method of claim 13, comprising:
responsive to obtaining the set of requests, filtering the textual description of the situation and the resolution in at least some of the requests of the set of requests to remove one or more predefined elements.

15. The method of claim 14, comprising:
responsive to filtering the textual description of the situation and the resolution in at least some of the requests of the set of requests, combining, for each request in the set of requests the textual description of the situation and the resolution to generate a combined text to represent each request.

16. The method of claim 15, wherein applying the unsupervised machine learning clustering technique to the textual descriptions included in the set of requests comprises:
applying the unsupervised machine learning clustering technique to the combined text.

17. The method of claim 13, wherein performing the textual analysis on the associated resolutions to identify the particular capabilities used by the agents to resolve the requests comprises:
performing the textual analysis on associated resolutions for each focus group of the set of focus groups.

18. An article of manufacture including a non-transitory computer-readable medium, having stored thereon program instructions that, upon execution by a computing system, cause the computing system to perform operations comprising:
obtaining, from a plurality of requests in a persistent storage, a set of requests from one or more client devices of a managed network, wherein persistent storage is configured to contain representations of the plurality of requests, wherein the computing system is configured to communicate with the one or more client devices of the managed network by way of one or more proxy servers, wherein the computing system is configured to host a client instance accessible to the one or more client devices by way of the managed network, the one or more proxy servers, or both, wherein the persistent storage includes lists of capabilities associated with a plurality of agents, and wherein each of the requests respectively includes a textual description of (i) a situation experienced by a user, and (ii) a resolution of the situation by a particular agent of the plurality of agents;
applying an unsupervised machine learning clustering technique to textual descriptions included in the set of requests;
arranging the requests from the set of requests into a plurality of groups, wherein the requests in each group of the plurality of groups include textual descriptions of at least a threshold degree of similarity to one another as determined by the unsupervised machine learning clustering technique;

responsive to arranging the requests from the set of requests into the plurality of groups, comparing a quantity of requests in each group of the plurality of groups with a predefined threshold quantity, wherein the predefined threshold quantity specifies a maximum number of requests per group;

based on determining that the quantity of requests for a specific group exceeds the predefined threshold quantity, applying a second iteration of the unsupervised machine learning clustering technique to textual descriptions included in requests in the specific group; and arranging the requests in the specific group into a set of focus groups based on results of the second iteration of the unsupervised machine learning clustering technique;

for the requests in a particular group of the plurality of groups, performing a textual analysis on associated resolutions to identify particular capabilities used by agents to resolve the requests in the particular group; and based on an outcome of the textual analysis, updating the lists of capabilities in the persistent storage to associate the particular capabilities with agents that used the particular capabilities.

19. The article of manufacture of claim 18, wherein the operations comprise, responsive to obtaining the set of requests, filtering the textual description of the situation and the resolution in at least some of the requests of the set of requests to remove one or more predefined elements.

20. The article of manufacture of claim 19, wherein the operations comprise, responsive to filtering the textual description of the situation and the resolution in at least some of the requests of the set of requests, combining, for each request in the set of requests, the textual description of the situation and the resolution to generate a combined text to represent each request.

\* \* \* \* \*